US010630450B2

United States Patent
Sun et al.

(10) Patent No.: US 10,630,450 B2
(45) Date of Patent: Apr. 21, 2020

(54) OVERLAPPING CODE BLOCK GROUPS FOR MULTIPLE CODEWORDS

(71) Applicant: QUALCOMM Incorporated, San Diego, CA (US)

(72) Inventors: Jing Sun, San Diego, CA (US); Piyush Gupta, Bridgewater, NJ (US); Jing Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/017,894

(22) Filed: Jun. 25, 2018

(65) Prior Publication Data

US 2018/0375634 A1 Dec. 27, 2018

Related U.S. Application Data

(60) Provisional application No. 62/525,730, filed on Jun. 27, 2017.

(51) Int. Cl.
*H04L 5/00* (2006.01)
*H04L 1/00* (2006.01)
(Continued)

(52) U.S. Cl.
CPC .......... *H04L 5/0055* (2013.01); *H04L 1/0023* (2013.01); *H04L 1/06* (2013.01);
(Continued)

(58) Field of Classification Search
CPC ....... H04L 5/0055; H04L 1/06; H04L 1/1861; H04L 1/1614; H04L 1/1812;
(Continued)

(56) References Cited

U.S. PATENT DOCUMENTS

| 2017/0026096 | A1* | 1/2017 | Roh .................... H04L 1/0003 |
| 2018/0167932 | A1* | 6/2018 | Papasakellariou .... H04L 1/1671 |
| 2018/0367253 | A1* | 12/2018 | Nammi .................... H04L 1/08 |

FOREIGN PATENT DOCUMENTS

| WO | WO-2018129017 A2 | 7/2018 |
| WO | WO-2018131880 A1 | 7/2018 |

OTHER PUBLICATIONS

International Search Report and Written Opinion—PCT/US2018/039563—ISA/EPO—dated Sep. 25, 2018.
(Continued)

*Primary Examiner* — Dady Chery
(74) *Attorney, Agent, or Firm* — Holland & Hart LLP

(57) ABSTRACT

Methods, systems, and devices for wireless communication are described that support overlapping code block groups (CBGs) for multiple codewords. A receiving device may receive multiple codewords from a transmitting device over a set of spatial layers. The receiving device may determine an association between a set of feedback bits and code blocks (CBs) of the multiple codewords. The association may be based on a CBG configuration, which may bundle one or more sets of CBs of the one or more codewords using time boundaries (e.g., symbols) or based on a uniform or proportional CB distribution. Based on whether decoding of the codewords is successful, the receiving device may transmit the set of feedback bits. The number of feedback bits may be the same regardless of whether one or two codewords are received.

30 Claims, 12 Drawing Sheets

(51) Int. Cl.
- H04L 1/18 (2006.01)
- H04L 1/06 (2006.01)
- H04W 4/70 (2018.01)
- H04L 1/16 (2006.01)
- H04L 5/14 (2006.01)

(52) U.S. Cl.
CPC .......... H04L 1/1812 (2013.01); H04L 1/1861 (2013.01); *H04L 1/1614* (2013.01); *H04L 5/001* (2013.01); *H04L 5/0023* (2013.01); *H04L 5/14* (2013.01); *H04W 4/70* (2018.02)

(58) Field of Classification Search
CPC ....... H04L 1/0023; H04L 5/14; H04L 5/0023; H04L 5/001; H04W 4/70
See application file for complete search history.

(56) References Cited

OTHER PUBLICATIONS

Samsung: "CBG Construction", 3GPP Draft; R1-1710725—CBG Construction, 3rd Generation Partnership Project (3GPP), Mobile Competence Centre; 650, Route Des Lucioles; F-06921 Sophia-Antipolis Cedex; France, vol. RAN WG1, No. Qingdao, P.R. China; Jun. 27-30, 2017, Jun. 16, 2017 (Jun. 16, 2017), XP051304355, Retrieved from the Internet: URL: http://www.3gpp.org/ftp/tsg_ran/WG1_RL1/TSGR1_AH/NR_AH_1706/Docs/ [retrieved on—Jun. 16, 2017].

Samsung: "Codeword-to-Layer Mapping for DL and UL NR MIMO", 3GPP Draft; R1-1701201, NR CW2L V3, 3rd Generation Partnership Project (3GPP), Mobile Competence Centre ; 650, Route Des Lucioles ; F-06921 Sophia-Antipolis Cedex; France, vol. RAN WG1, No. Spokane, USA; Jan. 16-20, 2017, Jan. 22, 2017 (Jan. 22, 2017), XP051222507, 7 pages, Retrieved from the Internet: URL: http://www.3gpp.org/ftp/tsg_ran/WG1_RL1/TSGR1_AH/NR_AH_1701/Docs/ [retrieved on—Jan. 22, 2017].

Samsung: "HARQ-ACK Feedback for CBG-Based Retransmissions", 3GPP Draft; R11710727, 3rd Generation Partnership Project (3GPP), Mobile Competence Centre, 650, Route Des Lucioles, F-06921 Sophia-Antipolis Cedex, France, vol. RAN WG1, No. Qingdao, P.R. China; Jun. 27-30, 2017, Jun. 26, 2017 (Jun. 26, 2017), XP051299932, 4 pages, Retrieved from the Internet: URL: http://www.3gpp.org/ftp/Meetings_3GPP_SYNC/RAN1/Docs/ [retrieved on Jun. 26, 2017].

* cited by examiner

OVERLAPPING CODE BLOCK GROUPS FOR MULTIPLE CODEWORDS

CROSS REFERENCES

The present Application for Patent claims benefit of U.S. Provisional Patent Application No. 62/525,730 by Sun et al., entitled "Overlapping Code Block Groups for Multiple Codewords," filed Jun. 27, 2017, assigned to the assignee hereof, and expressly incorporated by reference herein.

BACKGROUND

The following relates generally to wireless communication, and more specifically to overlapping code block groups (CBGs) for multiple codewords.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

In some wireless communications systems, transport blocks (TBs) may be utilized for data transmissions. The TBs may be divided into smaller code blocks (CBs), which may be encoded with an error correcting code to add redundancy. Exploitation of this redundancy in the encoded information may improve the reliability of the message by allowing a receiving device to correct for bit errors that may occur (e.g., due to noise). Codewords may include a set of encoded CBs and each CB may include information bits and additional bits for error detection (e.g., cyclic redundancy check (CRC) bits, parity check bits, filler bits, etc.). A codeword may be transmitted over one or more spatial layers having a given modulation and coding scheme (MCS). Groups of CBs (e.g., of multiple codewords) may be transmitted concurrently or sequentially and when all of the CBs of a TB are received and decoded by the receiving device, the receiving device may provide feedback information to the transmitting device indicating whether the received TB has been successfully decoded. However, the feedback information may not include an indication of which CBs or groups of CBs were unsuccessfully decoded, which may cause the transmitting device to retransmit the entire TB in response even when a portion of the CBs were successfully decoded. More efficient techniques for feedback are desired.

SUMMARY

The described techniques relate to improved methods, systems, devices, or apparatuses that support overlapping code block groups (CBGs) for multiple codewords. Generally, the described techniques provide for a receiving device to receive one or more codewords, each of which includes multiple code blocks (CBs). The one or more codewords may be received over a set of spatial layers. The receiving device may determine an association between a set of feedback bits (e.g., acknowledgement (ACK) or negative ACK (NACK) feedback bits) and the CBs of the multiple codewords based on a CB or CBG configuration. Based on whether decoding of the CBs that constitute a transport block (TB) is successful, the receiving device may transmit, to a transmitting device, a message that includes the set of feedback bits. In some cases, the number of feedback bits may be the same regardless of whether one or two codewords are received and the CB or CBG configuration may bundle one or more sets of CBs of the one or more codewords using time boundaries (e.g., symbols) or based on a uniform or proportional CB distribution. In response to the feedback bits, the transmitting device may determine which sets of CBs to retransmit.

A method of wireless communication is described. The method may include receiving a transmission including a first codeword received over a first set of layers and a second codeword received over a second set of layers, the first codeword including a first plurality of CBs and the second codeword including a second plurality of CBs; performing a decoding operation on the first and second pluralities of CBs of the transmission; determining an association between a set of feedback bits for the transmission and the first and second pluralities of CBs based at least in part on a CBG configuration for the first and second codewords, where a number of bits of the set of feedback bits correspond to a number of CBs for a single layer transmission; and transmitting a message including the set of feedback bits based at least in part on a result of the decoding operation and the determined association.

An apparatus for wireless communication is described. The apparatus may include means for receiving a transmission including a first codeword received over a first set of layers and a second codeword received over a second set of layers, the first codeword including a first plurality of CBs and the second codeword including a second plurality of CBs; means for performing a decoding operation on the first and second pluralities of CBs of the transmission; means for determining an association between a set of feedback bits for the transmission and the first and second pluralities of CBs based at least in part on a CBG configuration for the first and second codewords, where a number of bits of the set of feedback bits correspond to a number of CBs for a single layer transmission; and means for transmitting a message including the set of feedback bits based at least in part on a result of the decoding operation and the determined association.

Another apparatus for wireless communication is described. The apparatus may include a processor, memory in electronic communication with the processor, and instructions stored in the memory. The instructions may be operable to cause the processor to receive a transmission including a first codeword received over a first set of layers and a second codeword received over a second set of layers, the first codeword including a first plurality of CBs and the second codeword including a second plurality of CBs; perform a decoding operation on the first and second pluralities of CBs of the transmission; determine an association between a set of feedback bits for the transmission and the first and second pluralities of CBs based at least in part on a CBG configuration for the first and second codewords, where a number of bits of the set of feedback bits correspond to a number of CBs for a single layer transmission; and transmit a message including the set of feedback bits based at least in part on a result of the decoding operation and the determined association.

A non-transitory computer readable medium for wireless communication is described. The non-transitory computer-readable medium may include instructions operable to cause a processor to receive a transmission including a first codeword received over a first set of layers and a second codeword received over a second set of layers, the first codeword including a first plurality of CBs and the second codeword including a second plurality of CBs; perform a decoding operation on the first and second pluralities of CBs of the transmission; determine an association between a set of feedback bits for the transmission and the first and second pluralities of CBs based at least in part on a CBG configuration for the first and second codewords, where a number of bits of the set of feedback bits correspond to a number of CBs for a single layer transmission; and transmit a message including the set of feedback bits based at least in part on a result of the decoding operation and the determined association.

In some examples of the method, apparatus, and non-transitory computer-readable medium described above, the CBG configuration includes: assigning the first and second pluralities of CBs to CBGs according to time resource boundaries for the first and second codewords.

In some examples of the method, apparatus, and non-transitory computer-readable medium described above, determining the association between the set of feedback bits and the first and second pluralities of CBs includes bundling respective CBGs of the first and second codewords. Some examples of the method, apparatus, and non-transitory computer-readable medium described above may further include processes, features, means, or instructions for associating each feedback bit of the set of feedback bits with a respective bundled CBG.

Some examples of the method, apparatus, and non-transitory computer-readable medium described above may further include processes, features, means, or instructions for determining the number of feedback bits based at least in part on a number of symbols of the set of symbols, where each CBG of the CBGs spans a symbol of the set of symbols.

In some examples of the method, apparatus, and non-transitory computer-readable medium described above, determining the association between the set of feedback bits and the first and second pluralities of CBs includes determining a number of CBG bundles based at least in part on the number of bits of the set of feedback bits. Some examples of the method, apparatus, and non-transitory computer-readable medium described above may further include processes, features, means, or instructions for splitting the number of CBG bundles into a first set of CBG bundles for the first codeword and a second set of CBG bundles for the second codeword. Some examples of the method, apparatus, and non-transitory computer-readable medium described above may further include processes, features, means, or instructions for bundling consecutive CBGs of the first codeword and the second codeword into the first and second sets of CBG bundles.

In some examples of the method, apparatus, and non-transitory computer-readable medium described above, the number of CBG bundles may be uniformly split into the first set of CBG bundles and the second set of CBG bundles.

In some examples of the method, apparatus, and non-transitory computer-readable medium described above, the number of CBG bundles may be split into the first set of CBG bundles and the second set of CBG bundles in proportion to a number of CBs in the first codeword and a number of CBs in the second codeword.

In some examples of the method, apparatus, and non-transitory computer-readable medium described above, the message includes a feedback application bitmap indicating the applicability of the set of feedback bits to one or both of the first codeword or to the second codeword.

In some examples of the method, apparatus, and non-transitory computer-readable medium described above, the feedback application bitmap indicates whether all CBGs of one or both of the first codeword or the second codeword failed the decoding operation.

In some examples of the method, apparatus, and non-transitory computer-readable medium described above, a number of CBs of the first plurality of CBs may be different from a number of CBs of the second plurality of CBs.

In some examples of the method, apparatus, and non-transitory computer-readable medium described above, the CBG configuration includes: assigning the first and second pluralities of CBs to CBGs according to a uniform distribution.

In some examples of the method, apparatus, and non-transitory computer-readable medium described above, determining the association between the feedback bits and the first and second pluralities of CBs includes determining a number of CBGs based at least in part on the number of bits of the set of feedback bits. Some examples of the method, apparatus, and non-transitory computer-readable medium described above may further include processes, features, means, or instructions for splitting the number of CBGs into a first set of CBGs for the first codeword and a second set of CBGs for the second codeword in proportion to a number of CBs in the first codeword and a number of CBs in the second codeword. Some examples of the method, apparatus, and non-transitory computer-readable medium described above may further include processes, features, means, or instructions for uniformly splitting the first plurality of CBs into the first set of CBGs and the second plurality of CBs into the second set of CBGs.

A method of wireless communication is described. The method may include transmitting, in a first transmission, a first codeword over a first set of layers and a second codeword over a second set of layers, the first codeword including a first plurality of CBs and the second codeword including a second plurality of CBs; receiving a message including a set of feedback bits for the first codeword and the second codeword, the set of feedback bits associated with the first and second pluralities of CBs based at least in part on a CBG configuration for the first and second codewords, where a number of bits of the set of feedback bits correspond to a number of CBs for a single layer transmission; and determining whether to retransmit a CB of the first or second pluralities of CBs based at least in part on the set of feedback bits.

An apparatus for wireless communication is described. The apparatus may include means for transmitting, in a first transmission, a first codeword over a first set of layers and a second codeword over a second set of layers, the first codeword including a first plurality of CBs and the second codeword including a second plurality of CBs; means for receiving a message including a set of feedback bits for the first codeword and the second codeword, the set of feedback bits associated with the first and second pluralities of CBs based at least in part on a CBG configuration for the first and second codewords, where a number of bits of the set of feedback bits correspond to a number of CBs for a single layer transmission; and means for determining whether to retransmit a CB of the first or second pluralities of CBs based at least in part on the set of feedback bits.

Another apparatus for wireless communication is described. The apparatus may include a processor, memory in electronic communication with the processor, and instructions stored in the memory. The instructions may be operable to cause the processor to transmit, in a first transmission, a first codeword over a first set of layers and a second codeword over a second set of layers, the first codeword including a first plurality of CBs and the second codeword including a second plurality of CBs; receive a message including a set of feedback bits for the first codeword and the second codeword, the set of feedback bits associated with the first and second pluralities of CBs based at least in part on a CBG configuration for the first and second codewords, where a number of bits of the set of feedback bits correspond to a number of CBs for a single layer transmission; and determine whether to retransmit a CB of the first or second pluralities of CBs based at least in part on the set of feedback bits.

A non-transitory computer readable medium for wireless communication is described. The non-transitory computer-readable medium may include instructions operable to cause a processor to transmit, in a first transmission, a first codeword over a first set of layers and a second codeword over a second set of layers, the first codeword including a first plurality of CBs and the second codeword including a second plurality of CBs; receive a message including a set of feedback bits for the first codeword and the second codeword, the set of feedback bits associated with the first and second pluralities of CBs based at least in part on a CBG configuration for the first and second codewords, where a number of bits of the set of feedback bits correspond to a number of CBs for a single layer transmission; and determine whether to retransmit a CB of the first or second pluralities of CBs based at least in part on the set of feedback bits.

In some examples of the method, apparatus, and non-transitory computer-readable medium described above, the CBG configuration includes assigning the first and second pluralities of CBs to CBGs according to time resource boundaries for the first and second codewords.

In some examples of the method, apparatus, and non-transitory computer-readable medium described above, determining whether to retransmit the CB includes: bundling respective CBGs of the first and second codewords. Some examples of the method, apparatus, and non-transitory computer-readable medium described above may further include processes, features, means, or instructions for associating each feedback bit of the set of feedback bits with a respective bundled CBG.

In some examples of the method, apparatus, and non-transitory computer-readable medium described above, each CBG of the CBGs spans a symbol of a set of symbols over which the first transmission may be transmitted.

In some examples of the method, apparatus, and non-transitory computer-readable medium described above, determining whether to retransmit the CB includes determining a number of CBG bundles based at least in part on the number of bits of the set of feedback bits. Some examples of the method, apparatus, and non-transitory computer-readable medium described above may further include processes, features, means, or instructions for splitting the number of CBG bundles into a first set of CBG bundles for the first codeword and a second set of CBG bundles for the second codeword. Some examples of the method, apparatus, and non-transitory computer-readable medium described above may further include processes, features, means, or instructions for bundling consecutive CBGs of the first codeword and the second codeword into the first and second sets of CBG bundles.

In some examples of the method, apparatus, and non-transitory computer-readable medium described above, the number of CBG bundles may be uniformly split into the first set of CBG bundles and the second set of CBG bundles.

In some examples of the method, apparatus, and non-transitory computer-readable medium described above, the number of CBG bundles may be split into the first set of CBG bundles and the second set of CBG bundles in proportion to a number of CBs in the first codeword and a number of CBs in the second codeword.

In some examples of the method, apparatus, and non-transitory computer-readable medium described above, the message includes a feedback application bitmap indicating the applicability of the set of feedback bits to one or both of the first codeword or to the second codeword.

In some examples of the method, apparatus, and non-transitory computer-readable medium described above, the feedback application bitmap indicates whether all CBGs of one or both of the first codeword or the second codeword failed the decoding operation.

In some examples of the method, apparatus, and non-transitory computer-readable medium described above, a number of CBs of the first plurality of CBs may be different from a number of CBs of the second plurality of CBs.

In some examples of the method, apparatus, and non-transitory computer-readable medium described above, the CBG configuration includes: assigning the first and second pluralities of CBs to CBGs according to a uniform distribution.

In some examples of the method, apparatus, and non-transitory computer-readable medium described above, determining whether to retransmit the CB includes: determining a number of CBGs based at least in part on the number of bits of the set of feedback bits. Some examples of the method, apparatus, and non-transitory computer-readable medium described above may further include processes, features, means, or instructions for splitting the number of CBGs into a first set of CBGs for the first codeword and a second set of CBGs for the second codeword in proportion to a number of CBs in the first codeword and a number of CBs in the second codeword. Some examples of the method, apparatus, and non-transitory computer-readable medium described above may further include processes, features, means, or instructions for uniformly splitting the first plurality of CBs into the first set of CBGs and the second plurality of CBs into the second set of CBGs.

DETAILED DESCRIPTION

Figure 1:
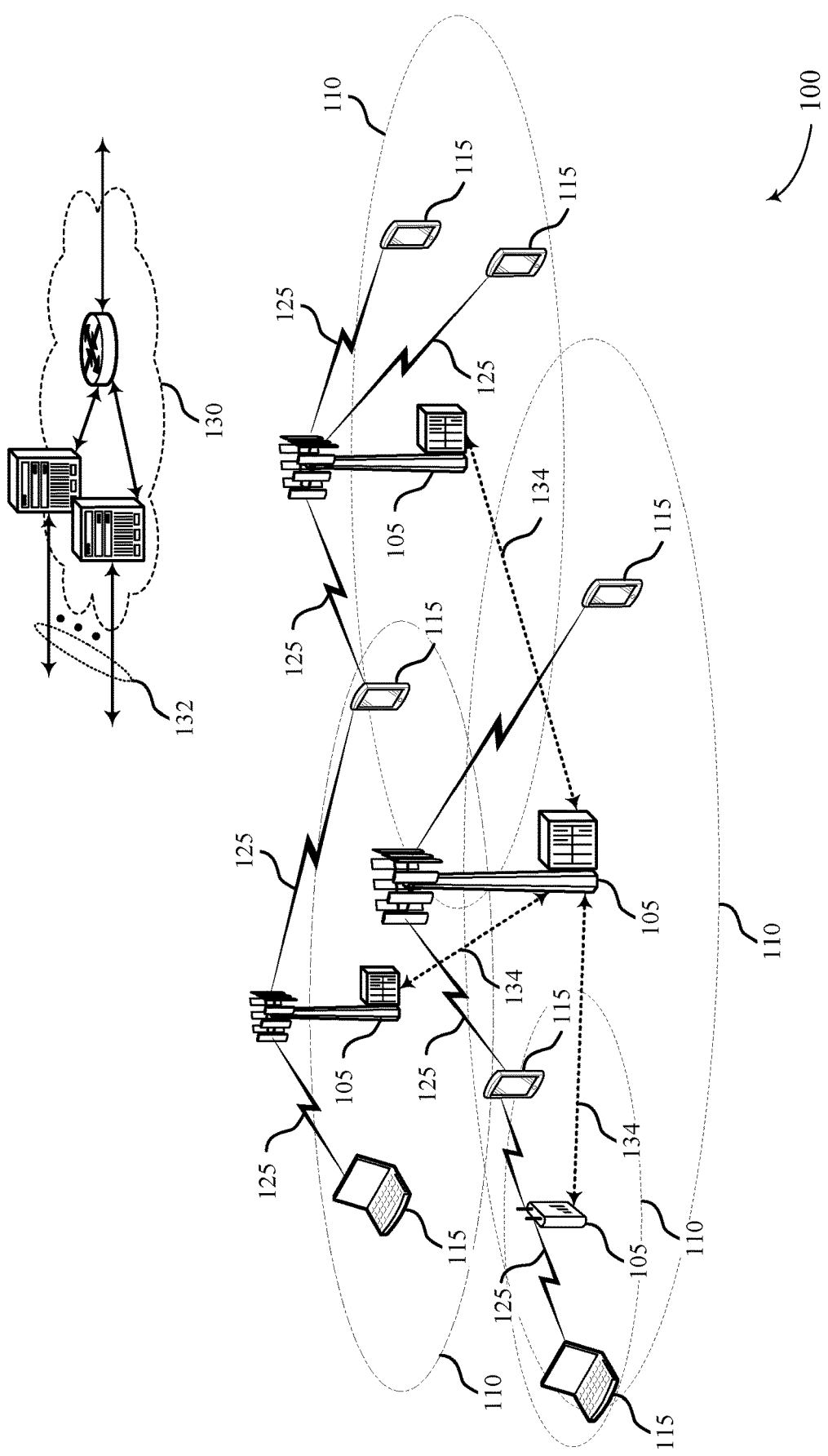
FIG. 1 illustrates an example of a system for wireless communication that supports overlapping code block groups (CBGs) for multiple codewords in accordance with aspects of the present disclosure.

The described techniques relate to improved methods, systems, devices, or apparatuses that support overlapping code block groups (CBGs) for multiple codewords. A transport block (TB) may be utilized for data transmissions. The TBs may be divided into smaller code blocks (CBs) and a codeword may be generated that includes a set of encoded CBs. Each CB may include additional bits that may be used for error detection and correction. A CBG may include a set of CBs from one or more TBs and, after decoding a set of CBs corresponding to a TB, a receiving device may send feedback to the transmitting device to indicate whether decoding of the TB was successful. For example, when one or more of the CBs is not successfully decoded by a receiving device, the receiving device may transmit a negative acknowledgement (NACK) indicating the corresponding CBG with unsuccessfully transmitted CB(s); alternatively or additionally, an acknowledgement (ACK) may be transmitted to indicate that a corresponding CBG has been successfully decoded. In some cases, an ACK/NACK feedback bit may be reserved for each CBG of the codeword. A transmitting device (e.g., a base station) may retransmit the CBs within each CBG for which a NACK has been received. The retransmission may be performed using a hybrid automatic repeat request (HARQ) process, rather than retransmitting the entire TB.

In some cases, multiple codewords (e.g., two) may be transmitted when a certain number of spatial layers are utilized for uplink and/or downlink transmissions. However, even when multiple codewords are transmitted, the number of ACK/NACK feedback bits may be limited to the number of feedback bits used for transmission of a single codeword. In some examples, a transmitting device may group the CBGs of both codewords together in a certain format in order to ensure that all CBs have an at least partly associated ACK/NACK feedback bit while leaving the total number of ACK/NACK feedback bits static. In some examples, the first and second codewords may have corresponding CBGs (e.g., each defined by the same boundaries) and corresponding CBGs may be bundled for association with the ACK/NACK feedback bits. In other examples, CBGs of each codeword may be bundled together uniformly for association with the ACK/NACK feedback bits such that approximately the same number of CBGs are bundled together, uniformly or non-uniformly (e.g., in proportion to number of CBs). As used herein, the term "uniformly" should be understood to include approximately uniformly based on splitting an integer into groups of integers. For example, uniformly may mean that any given CBG bundle has at most one more CBG than any other CBG bundle. That is, a number N of CBGs may be uniformly bundled if there are X CBG bundles with R CBGs and Y bundles with S CBGs such that $X*R+Y*S=N$. There may be a variety of ways to uniformly group CBGs. In other examples, the number of CBs may be split among a number of CBGs for both (or multiple) codewords based on the total number of CBs between both codewords. In other examples, additional bits may be added to the ACK/NACK feedback bits to provide a bitmap to indicate for which codewords (i.e., the first codeword, the second codeword, or both) the ACK/NACK feedback bits are intended.

Aspects of the disclosure are initially described in the context of a wireless communications system. Various codeword and CBG configurations are then described. A process flow illustrating aspects of the disclosure is also described. Aspects of the disclosure are further illustrated by and described with reference to apparatus diagrams, system diagrams, and flowcharts that relate to overlapping CBGs for multiple codewords.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Some examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, Internet Protocol (IP) connectivity, and other access, routing, or mobility functions. At least some of the network devices may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use HARQ to provide retransmission at the MAC layer to improve link efficiency. In the control plane, the Radio Resource Control (RRC) protocol layer may provide establishment, configuration, and maintenance of an RRC connection between a UE 115 and a network device (e.g., a base station 105 or node of the core network 130) supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each Orthogonal Frequency Division Multiplexing (OFDM) symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both Frequency Division Duplexing (FDD) and Time Division Duplexing (TDD) component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 GHz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on FDD, TDD or a combination of both.

A transmitting device (e.g., a base station 105) may broadcast control information including one or more control channels, such as a physical broadcast control channel (PBCH); a primary synchronization signal (PSS); a secondary synchronization signal (SSS); a physical control format indicator channel (PCFICH); a physical HARQ indicator channel (PHICH); and/or a physical downlink control channel (PDCCH), etc., to one or more receiving devices (e.g., UEs 115). The PHICH carries HARQ feedback transmissions such as an ACK or NACK. HARQ may involve checking packet transmissions at the receiving device for accuracy, and if confirmed, an ACK may be transmitted, whereas if not confirmed, a NACK may be transmitted. In response to a NACK, the transmitting device may send a HARQ retransmission, which may implement chase combining, incremental redundancy, etc. HARQ retransmission may be performed for uplink traffic and downlink traffic.

Uplink and downlink transmissions may generally utilize a suitable error correcting block code. In a typical block code (i.e., a codeword), an information message or sequence is split up into CBs, and an encoder at the transmitting device then mathematically adds redundancy to the information message. Exploitation of this redundancy in the encoded information message can improve the reliability of the message, enabling correction for any bit errors that may occur due to the noise. Some examples of error correcting codes include Hamming codes, Bose-Chaudhuri-Hocquenghem (BCH) codes, turbo codes, low-density parity check (LDPC) codes, and polar codes. Various implementations of base stations 105 and UEs 115 may include suitable hardware and capabilities (e.g., an encoder and/or decoder) to utilize any one or more of these error correcting codes for wireless communication.

In some cases, multiple codewords may be utilized for uplink and/or downlink transmissions. The number of codewords utilized may depend on a rank (e.g., a number of spatial layers used for transmissions). The number of spatial layers used for transmission may correspond to the number of physical antennas of the transmitting device or the number of antenna ports or virtual antennas of the transmitting device. Each of the multiple codewords may be transmitted using one or more sets of spatial layers (e.g., based on channel conditions, number of codewords, number of transmitting antennas). For example, for a rank of 1-4, one codeword may be transmitted (e.g., over a single spatial layer) and for a rank of 5-8, two codewords may be transmitted over multiple or a set of spatial layers. A base station 105 may dynamically select the rank according to channel conditions. Each codeword may have a different modulation and coding scheme (MCS), which may result in different TB size and number of CBs.

As discussed previously, the CBs may be grouped together into CBGs. If one or more CBs within a CBG are not successfully transmitted, a receiving device (i.e., a UE 115) may transmit a NACK feedback bit for the corresponding CBG, and a transmitting device (i.e., a base station 105) may send a HARQ retransmission of that particular CBG. If the unsuccessfully transmitted CBs are located within multiple CBGs, each affected CBG may be retransmitted. Rather than each TB having an associated feedback bit, each CBG may have an associated ACK/NACK feedback bit. However, the number of ACK/NACK feedback bits may be fixed whether one or two codewords are transmitted (e.g., in order to avoid blind decoding assuming different lengths for either physical uplink control channels (PUCCH) or PDCCH).

Wireless communications system 100 may support efficient techniques to transmit ACK/NACK feedback for multiple codewords using a fixed number of ACK/NACK feedback bits. In some cases, an ACK/NACK feedback bit may be utilized for corresponding CBGs of each codeword. For example, a first CBG of a first codeword may be grouped together with a first CBG of a second codeword, and if a CB within either CBG is unsuccessfully transmitted, both CBGs may be retransmitted together. Alternatively, multiple CBGs within each codeword may be bundled together for each ACK/NACK feedback bit. In other cases, additional bits may be added to the ACK/NACK feedback bits to indicate for which codeword, or both, the ACK/NACK feedback applies.

Figure 2:
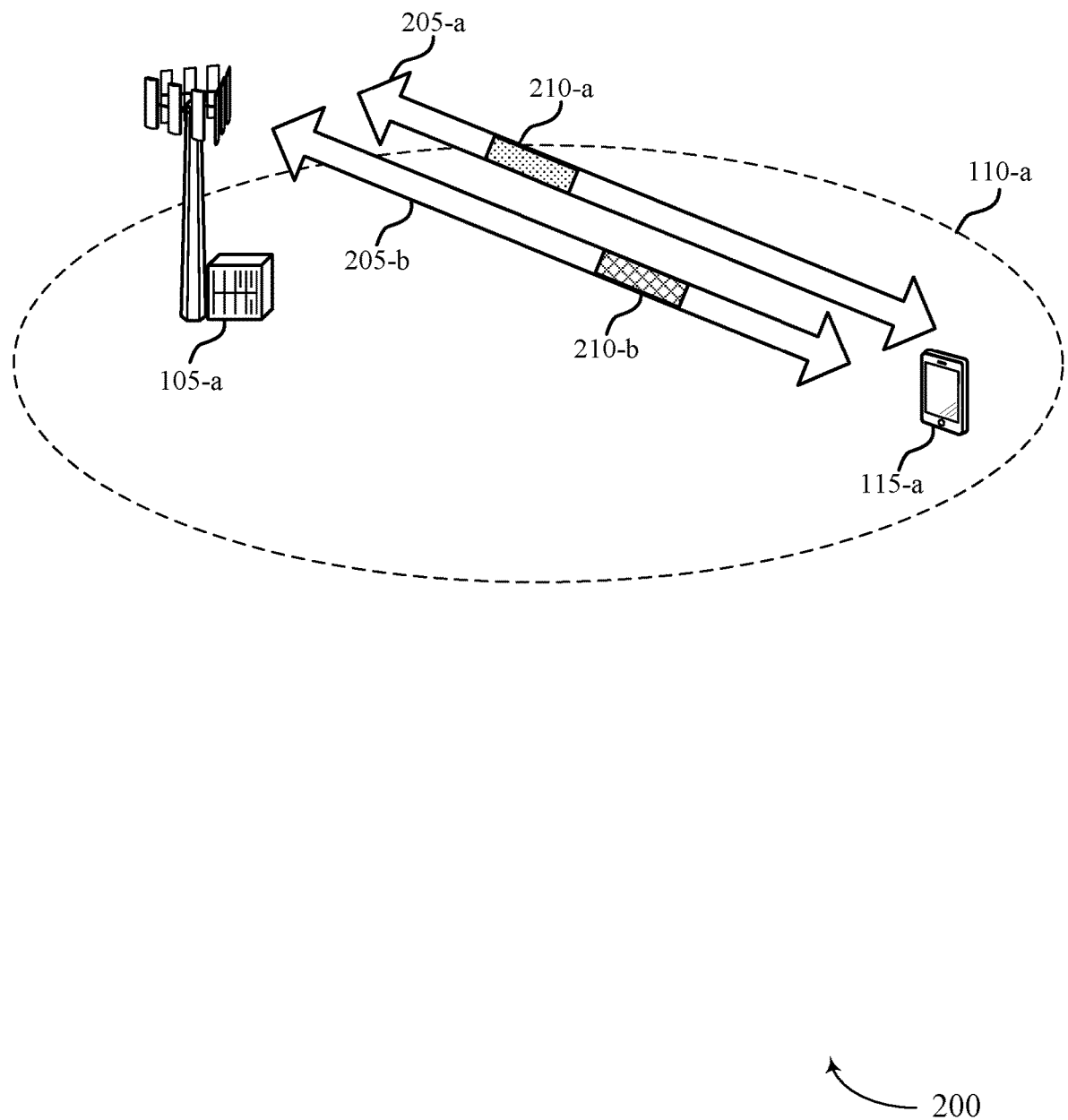
FIG. 2 illustrates an example of a wireless communications system that supports overlapping CBGs for multiple codewords in accordance with aspects of the present disclosure.

FIG. 2 illustrates an example of a wireless communications system 200 that supports overlapping code block groups for multiple codewords in accordance with various aspects of the present disclosure. In some examples, wireless communications system 200 may implement aspects of wireless communications system 100. Wireless communications system 200 may include a base station 105-a and a UE 115-a, which may be examples of corresponding base stations 105 and UEs 115 as described with reference to FIG. 1. Base station 105-a may provide communication coverage for a coverage area 110-a. Base station 105-a and UE 115-a may communicate on resources of a communication link 205. The communications may include a first codeword 210-a and a second codeword 210-b.

Base station 105-a may utilize multiple spatial layers (e.g., multiple antenna ports) to transmit codewords 210. For example, base station 105-a may transmit codeword 210-a using a first spatial layer over communication link 205-a and may also transmit codeword 210-b using a second spatial layer over communication link 205-b. The transmission of the two codewords 210 may occur at the same time (e.g., within the same TTI) or at different times. In some cases, a single codeword 210 may be transmitted over multiple spatial layers. For instance, codeword 210-a may be transmitted using four spatial layers by transmitting every fourth bit of codeword 210-a on one layer.

Communication links 205-a and 205-b may utilize the same frequency resources (e.g., subcarriers) for transmission of the codewords 210 or may each utilize different frequency resources. In some examples, communication links 205-a and 205-b may correspond to different antennas of the transmitting device (e.g., base station 105-a), which may be received at a receiving device (e.g., UE 115-a) over one or more antennas.

UE 115-a may transmit codeword 210-a and codeword 210-b to base station 105-a on multiple antenna ports, which may correspond to the number of spatial layers used by the base station 105-a for transmission. When transmitting multiple codewords 210 using multiple spatial layers, both codewords 210 may be received at approximately the same time.

To determine the number of layers for transmission, a rank indicator (RI) may be transmitted (e.g., from UE 115-a to base station 105-a), which may be used to indicate the number of layers the UE 115-a is able to successfully receive. The RI may be determined based on channel conditions and the number of layers for transmission may be determined based on the RI. The number of layers may then be transmitted by the base station 105-a (e.g., over a PDCCH on resources of communication link 205-a or 205-b). The PDCCH may indicate a number of layers (i.e., a rank) for one or more subsequent transmissions. In some cases, the PDCCH may also indicate a number of CBGs and codeword configurations for codewords 210 and each codeword 210 may have a different MCS, which may result in different TB size and a different number of CBs for different TBs.

Figure 3:
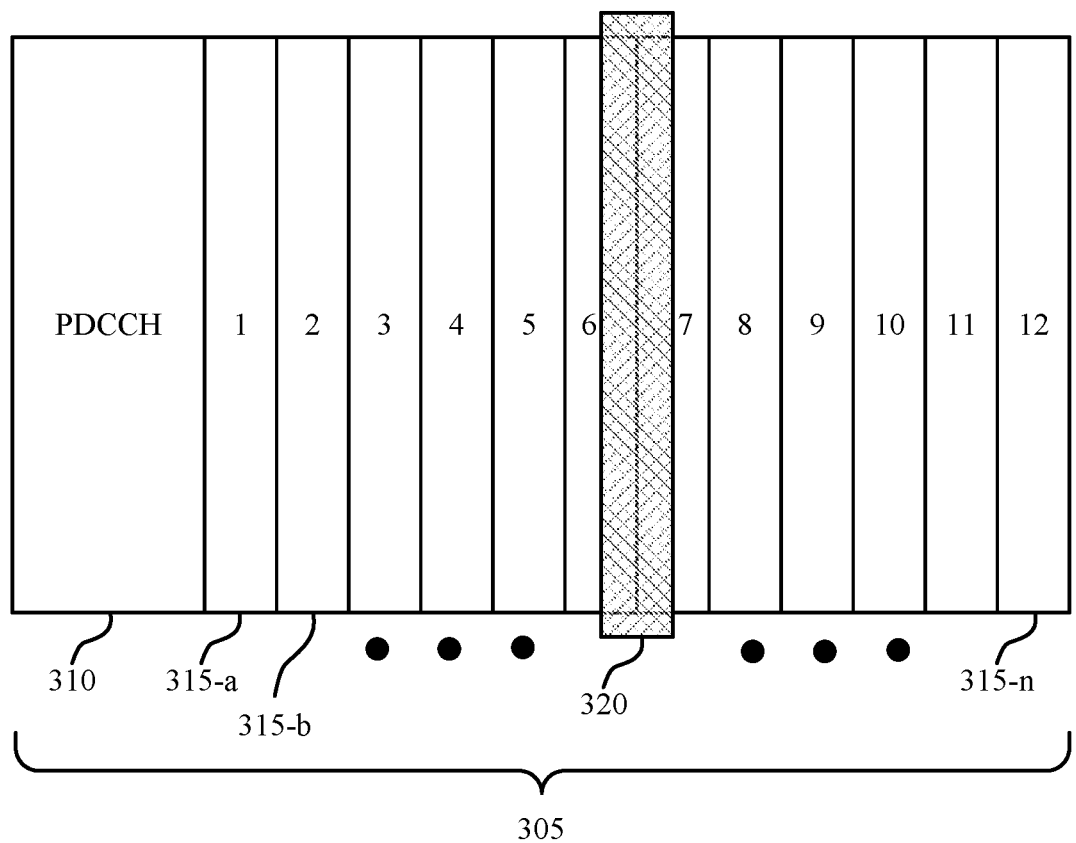
FIG. 3 illustrates an example of a codeword that supports overlapping CBGs for multiple codewords in accordance with aspects of the present disclosure.

FIG. 3 illustrates an example of a codeword 300 that supports overlapping code block groups for multiple codewords in accordance with various aspects of the present disclosure. In some examples, codeword 300 may implement aspects of wireless communications system 100. Codeword 300 may be transmitted over a slot 305 and may span a plurality of symbols following a PDCCH 310. In this example, a CBG configuration may be used to group CBs of a TB using time boundaries (e.g., OFDM symbols 1 through 12).

PDCCH 310 may indicate a rank for the upcoming transmissions, as well as the size of a TB of codeword 300. CBGs 315 may be defined by boundaries in time-frequency resources (e.g., OFDM symbols). In the example of FIG. 3, CBGs 315 may utilize symbol boundaries to separate each CBG 315, such that each symbol following PDCCH 310 is associated with a respective CBG 315. For instance, the first symbol following PDCCH 310 may correspond to CBG 315-$a$, the second symbol following PDCCH 310 may correspond to CBG 315-$b$, etc. and so on, where the last symbol of slot 305 corresponds to CBG 315-$n$. While 12 CBGs 315 are depicted in FIG. 2, the number of symbols may vary according to subcarrier spacing, symbol duration, slot duration, or other parameters.

During transmission of codeword 300, interference 320 may cause one or more CBs within a subset of CBGs 315 to be unsuccessfully decoded at the receiver. As a result, one or more NACK feedback bits may be transmitted to indicate the CBGs 315 with unsuccessfully decoded CBs. In order to reduce the number of CBs that may be retransmitted, an overlapping CBG design for CB grouping may be utilized, such that CBs on the boundary between two adjacent CBGs 315 may be included in both of the adjacent CBGs 315. As interference 320 may be bursty, and if multiple CBGs are configured to span a symbol boundary, the bursty interference may affect more CBs of the CBGs. For example, CBGs 315 may be configured such that CBs that fall on the boundary between adjacent CBGs 315 may overlap. A first CBG 315-$a$ may include, for instance, CBs 0-5 and a second CBG 315-$b$ may include CBs 5-10 with CB 5 overlapping between the first CBG 315-$a$ and the second CBG 315-$b$. A third CBG 315-$c$ may include CBs 10-15 with CB 10 overlapping between the second and third CBGs, and so on. By utilizing the overlapping pattern, a smaller number of CBs and/or CBGs may be retransmitted. For example, if interference 320 affects symbols 6 and 7 as illustrated, the CBGs associated with symbols 6 and 7 may be retransmitted, which may include portions of some CBs that are in either or both of symbols 5 and 8. The CBs that overlap either of symbols 5 or 8 may also be retransmitted. However, if CBGs are defined by numbers of CBs without regard to symbol boundaries, there may be three CBGs that may need to have all CBs of the CBGs retransmitted, which may be a substantially greater number of CBs for the same approximate CBG size.

Figure 4:
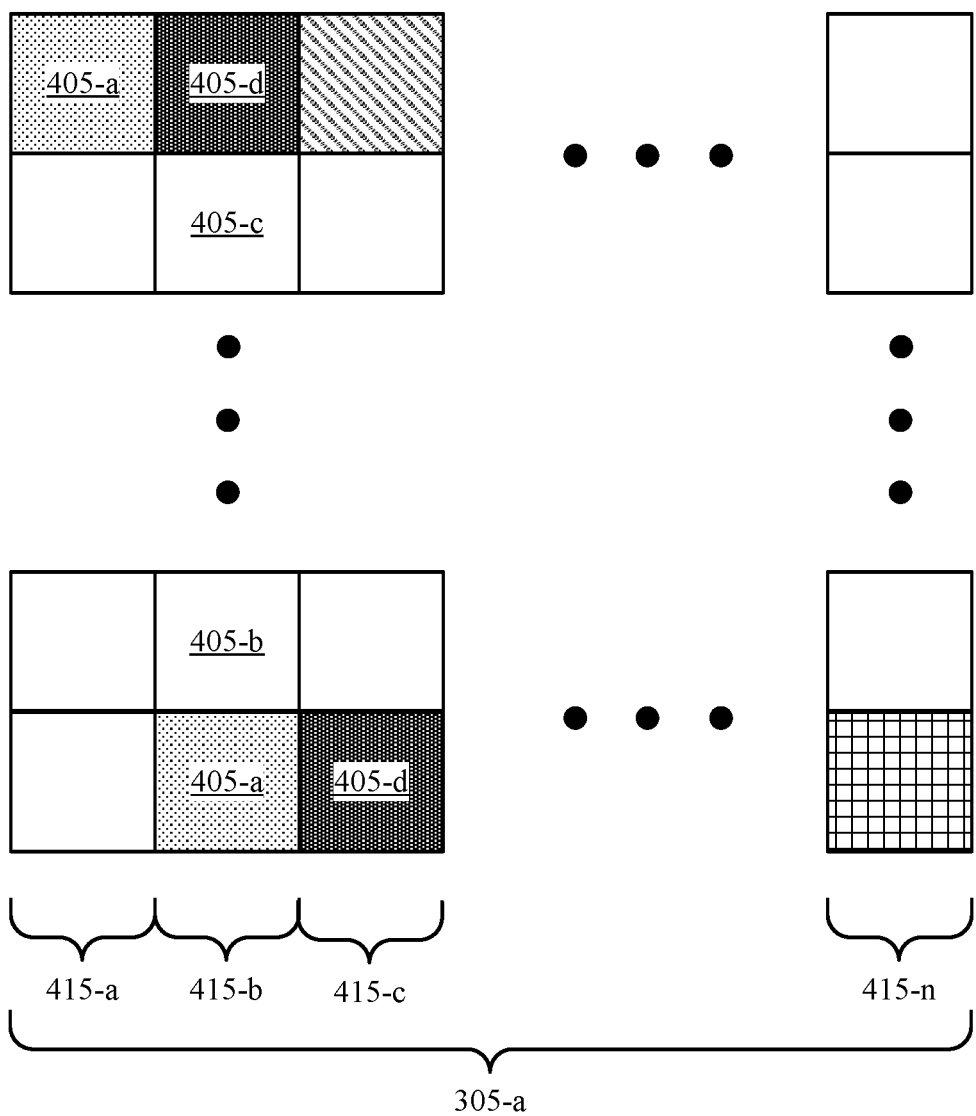
FIG. 4 illustrates an example of a CBG configuration that supports overlapping CBGs for multiple codewords in accordance with aspects of the present disclosure.

FIG. 4 illustrates an example of a CBG configuration 400 that supports overlapping code block groups for multiple codewords in accordance with various aspects of the present disclosure. In some examples, CBG configuration 400 may be implemented by aspects of wireless communications system 100 such as base stations 105 or UEs 115. CBG configuration 400 may include a number of CBs 405 and CBGs 415 within a slot 305-$a$, which may be examples of CBGs 315 as described in FIG. 3. CBG configuration 400 illustrates an overlapping CB grouping for CBGs 415.

As shown, each CBG 415 may include CBs that overlap with a preceding and/or subsequent CBG 415. CBG 415-$a$ may represent the first CBG 415 within a codeword. As such, CBG 415-$a$ may only have one overlapping CB with a following CBG. For example, CB 405-$a$ may be partially within CBG 415-$a$ and CBG 415-$b$. Additionally, CBG 415-$b$ may share CBs with both CBG 415-$a$ and a following CBG. For example, CB 405-$a$ spans portions of CBG 415-$a$ and 415-$b$ while CB 405-$d$ spans portions of CBG 415-$b$ and CBG 415-$c$. Similar overlapping occurs up to CBG 415-$n$, which may only share overlapping CB N with a preceding CBG 415 (not shown).

By utilizing an overlapping CB pattern, the number of total CBs to be retransmitted as a result of interference may be reduced. For example, interference or other channel conditions may cause signal for the second symbol period of CBG 415-$b$ to be degraded, which may cause CBs 405-$a$, 405-$b$, 405-$c$, and 405-$d$ to be unsuccessfully decoded at the receiving device. When the NACK feedback is retransmitted for CBG 415-$b$, the transmitter may know to retransmit all CBs that are at least partially overlapping with CBG 415-$b$. If, however, CBGs were defined by a number of CBs (e.g., the CBs are substantially uniformly split into CBGs without regard for symbol boundaries), interference that degrades the signal for the second symbol period may cause CBs that span portions of two CBGs to be unsuccessfully decoded at the receiving device. Thus, the receiver would send a NACK for two CBGs, and all CBs of those CBGs would need to be retransmitted, even where several CBs within each of the two CBGs were actually decoded successfully.

The number of CBs within the slot 305-$a$ may be determined by the TB size and the CB size (e.g., data may be segmented into CBs of the same or similar size). The TB size may depend on the amount of resources granted within the slot 305-$a$ and the modulation and coding scheme. Additionally, the number of CBs within CBGs 415 of different codewords may vary and be specific to each codeword.

Figure 5:
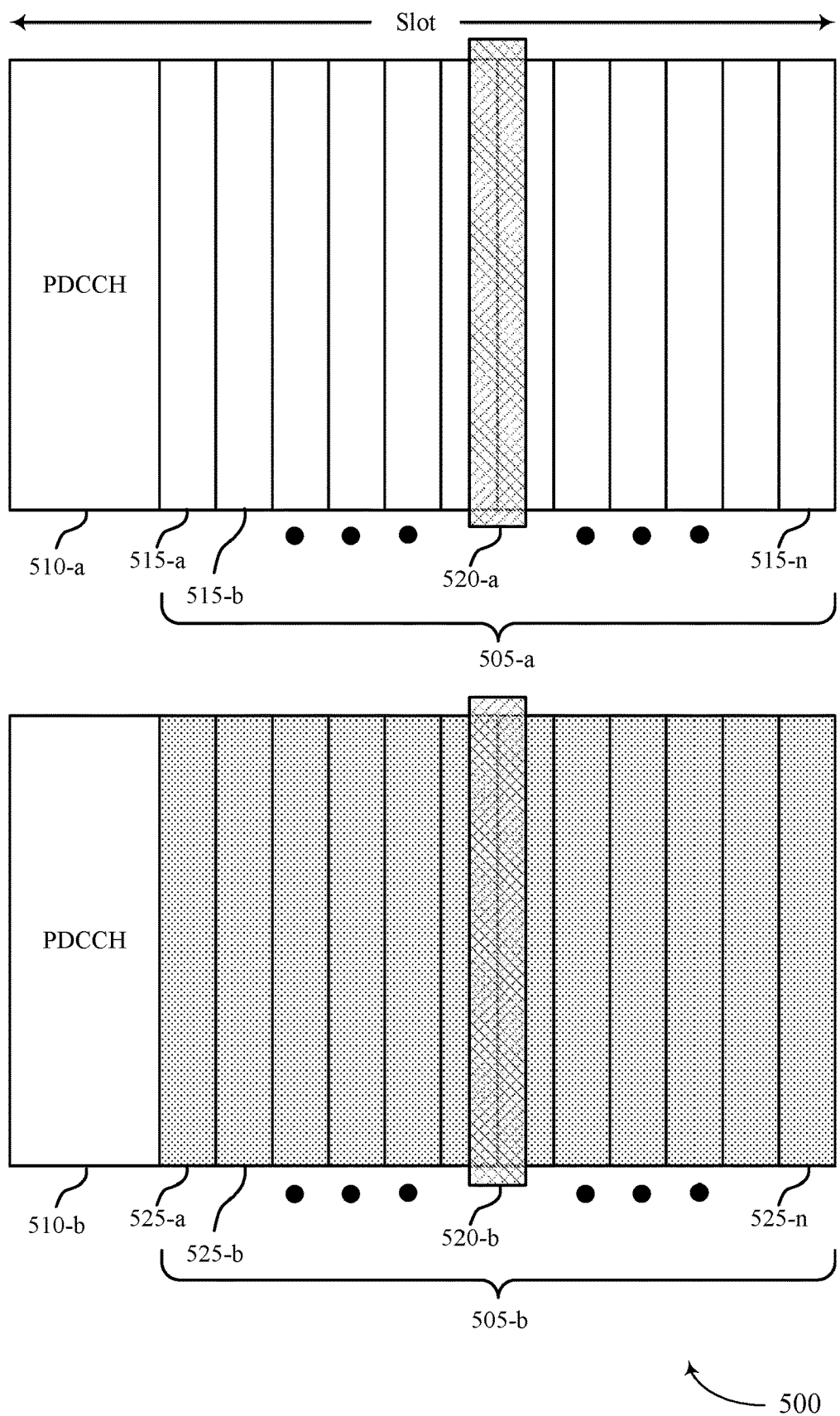
FIG. 5 illustrates an example of codeword configurations that support overlapping CBGs for multiple codewords in accordance with aspects of the present disclosure.

FIG. 5 illustrate example codeword configuration 500 that supports overlapping code block groups for multiple codewords in accordance with various aspects of the present disclosure. In some examples, codeword configuration 500 may be implemented by aspects of wireless communications system 100 including base stations 105 or UEs 115. Codeword configuration 500 may include a first codeword 505-$a$ and a second codeword 505-$b$, which may be transmitted over multiple spatial layers. For example, if the rank of a transmission is greater than a threshold (e.g., 2 spatial layers, 4 spatial layers), the number of spatial layers may be split into sets of spatial layers, where the first codeword 505-$a$ is transmitted over a first set of spatial layers and the second codeword 505-$b$ is transmitted over a second set of spatial layers. Codeword 505-$a$ may include CBGs 515 and codeword 505-$b$ may include CBGs 525, which may be examples of CBGs 415 as described with reference to FIG. 4. Codeword configurations 500 may illustrate techniques to group CBGs 515 and CBGs 525 in order to maintain a fixed number of ACK/NACK feedback bits.

A resource grant for the slot may be carried in one or both of PDCCH 510-$a$ or PDCCH 510-$b$. The resource grant may indicate the TB size for codeword 505-$a$ and codeword 505-$b$ as well as the layer assignment (e.g., for a 6-layer transmission, codeword 505-$a$ may be carried by three layers and codeword 505-$b$ may be carried by a different set of three layers). The TB sizes for codewords 505-$a$ and 505-$b$ may indicate the number CBs within codewords 505-$a$ and 505-$b$. Similarly, PDCCH 510-$b$ may indicate the number of CBGs 525 and the number of CBs within each CBG 525 for codeword 505-$b$. The number of CBGs 515 for codeword 505-$a$ may be the same as the number of CBGs 525 for codeword 505-$b$. However, the number of CBs for each codeword 505 may be unique to each codeword 505 (e.g., based on different TB sizes). As such, the number of CBs per CBG 515 and the number of CBs per CBG 525 may differ. Each CBG may utilize the CB overlapping pattern as described in FIG. 4.

As described in FIG. 3, CBGs 515 and 525 may utilize symbol boundaries to separate CBs in each CBG 515 and 525, respectively. The same boundary may apply for the CBGs of both codeword 505-*a* and codeword 505-*b*. By utilizing the same symbol boundaries and the same number of CBGs, dynamic switching between one codeword 505 and two codewords 505 may be supported. Additionally, by utilizing the same number of CBGs and symbol boundaries, CBGs 515 and 525 may be bundled together within their symbol boundaries for each ACK/NACK feedback bit. For example, CBG 515-*a* of codeword 505-*a* may be combined with CBG 525-*a* of codeword 505-*b* for a single ACK/NACK feedback bit, CBG 515-*b* and CBG 525-*b* may be combined for an ACK/NACK feedback bit, and so on up to CBG 515-*n* and CBG 525-*n*.

Similar to FIG. 3, an interference 520 may lead to certain CBs within a subset of CBGs 515 and 525 to be unsuccessfully transmitted. Interference 520-*a* may affect CBGs 515 and interference 520-*b* may affect CBGs 525. In some examples, interference 520 may affect the same CBGs within each codeword 505. Therefore, by grouping the same numbered CBG 515 with its respective CBG 525, which both may be affected by interference 520, the number of ACK/NACK feedback bits may be reduced.

Figure 6:
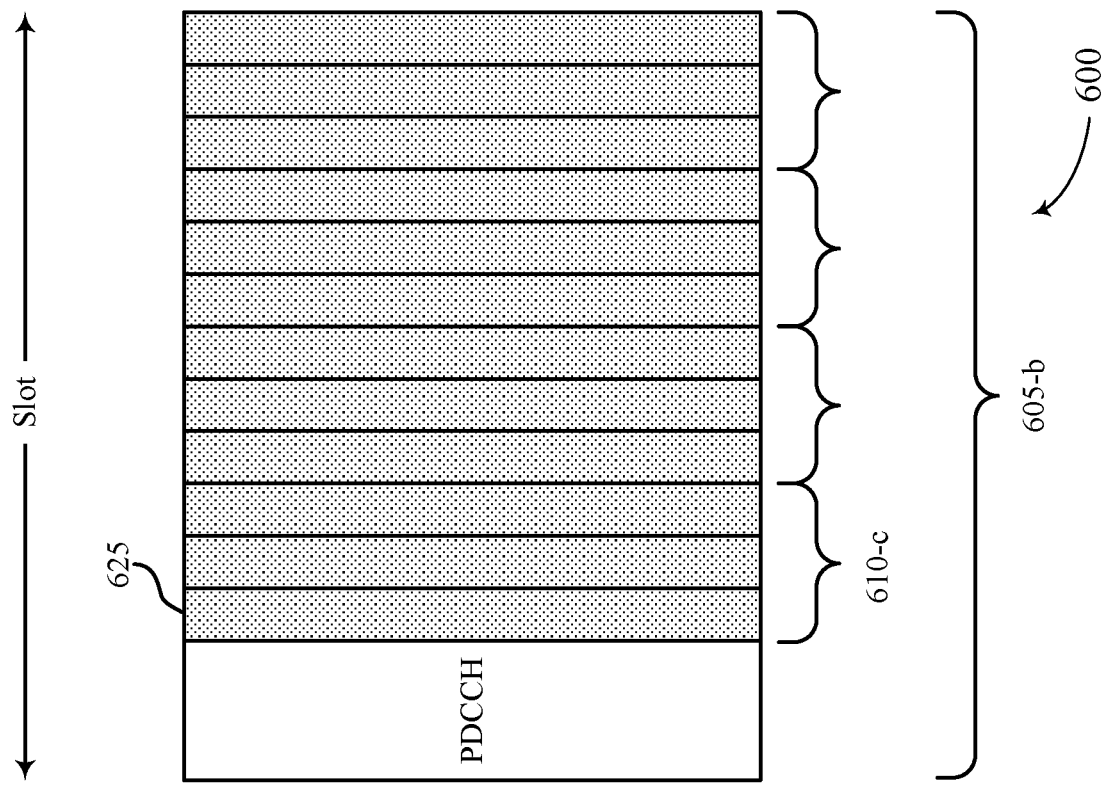
FIG. 6 illustrates an example of CBG configurations that support overlapping CBGs for multiple codewords in accordance with aspects of the present disclosure.
Figure 6:
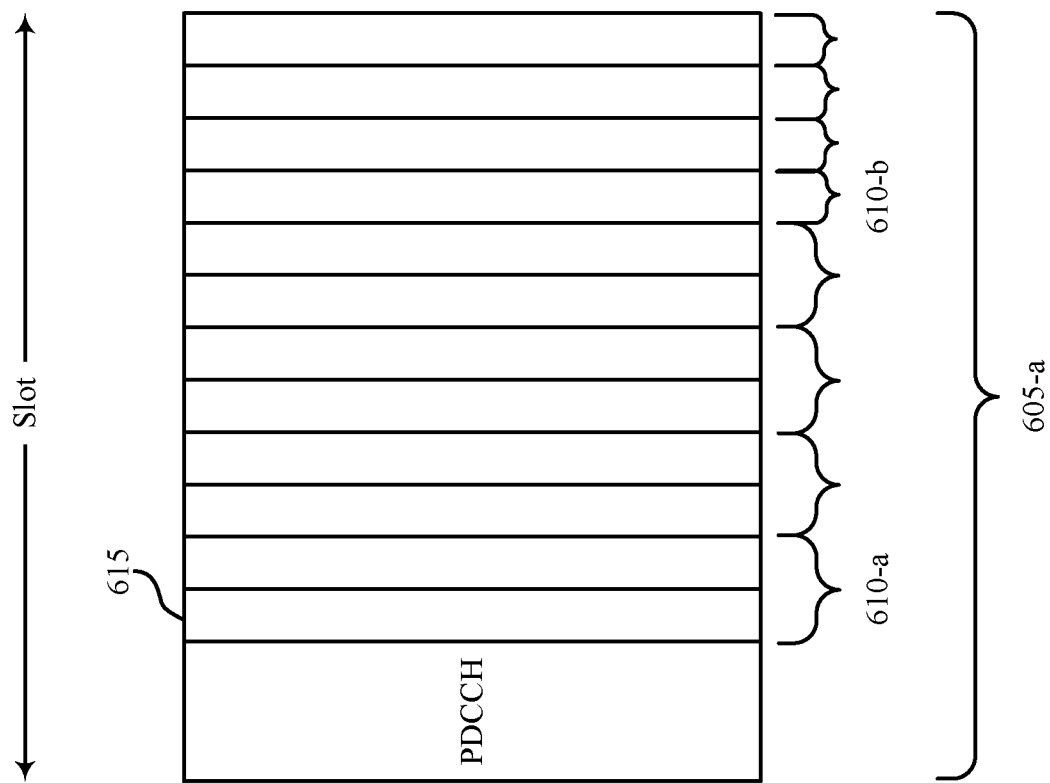

FIG. 6 illustrates example CBG configurations 600 that support overlapping code block groups for multiple codewords in accordance with various aspects of the present disclosure. In some examples, CBG configurations 600 may implement aspects of wireless communications system 100. CBG configurations 600 may include a first codeword 605-*a* and a second codeword 605-*b*, which may be examples of codewords 300 or 505 as described with reference to FIGS. 3 and 5, respectively. Codeword 605-*a* may include CBGs 615 and codeword 605-*b* may include CBGs 625, which may be examples of CBGs 415 and CBGs 515 and 525 as described with reference to FIGS. 4 and 5, respectively. The number of CBGs 615 and CBGs 625 may be the same. CBG configurations 600 may illustrate techniques for bundling CBGs 615 and 625 together separately within each codeword 605 while maintaining a fixed number of ACK/NACK feedback bits.

Codeword 605-*a* and codeword 605-*b* may have separate MCS control, which may result in both being affected by a type of interference differently. For example, different outer loop backoffs for each codeword 605 or interference hitting some spatial layers may result in CBs of codeword 605-*a* to fail, but not CBs of codeword 605-*b*, or vice-versa. CBGs 615 and 625 may utilize symbol boundaries to separate CBs in each CBG as described in FIGS. 3 and 5. CBG bundles 610 may combine CBGs within each codeword 605, where bundle 610-*a* may indicate two CBGs bundled together, bundle 610-*b* may indicate a single CBG, and bundle 610-*c* may indicate three CBGs bundled together.

In some cases, bundles 610 may be determined by a uniform split of CBG bundles between codeword 605-*a* and codeword 605-*b*. For example, when the number of CBGs per codeword 605 is even, CBGs 615 and 625 may be bundled into bundles of two CBGs (e.g., bundle 610-*a*), so that every two CBGs within a codeword 605 share one ACK/NACK feedback bit. Therefore, the number of ACK/NACK bits per codeword 605 is halved, resulting in the same total number of ACK/NACK feedback bits overall. However, if the number of CBGs per codeword 605 is odd, bundles of two CBGs may be utilized until no more bundles of two may be formed, and such that a CBG bundle 610 does not span CBGs from both codeword 605-*a* and codeword 605-*b*. For example, if the number of CBGs per codeword 605 is nine, codeword 605-*a* may include five total bundles with four bundles 610-*a* of two CBGs 615 and one CBG bundle 610-*b* of one CBG 615. Additionally, codeword 605-*b* may include four total bundles with three CBG bindles 610-*a* of CBGs 625 and one CBG bundle 610-*c* of three CBGs 625. The nine bundles 610 may each correspond to a different ACK/NACK feedback bit.

In other cases, bundles 610 may be determined by a non-uniform split of CBG bundles between codeword 605-*a* and codeword 605-*b* by approximately equalizing the number of CBs in each CBG bundle 610. The MCS for each codeword 605 may be very different, resulting in the number of CBs per CBG to be different for each codeword 605. The CBG bundles 610 may be split between codewords 605-*a* and 605-*b* by counting the total number of CBs in each codeword 605 and proportionally splitting CBG bundles 610. For example, codeword 605-*a* may have 61 CBs in 12 CBGs 615, and codeword 605-*b* may have 39 CBs in 12 CBGs 625. Therefore, there is a total of 100 CBs that may be divided among 12 CBGs bundles, where codeword 605-*a* has approximately 60% of the total CBs (i.e., 61/100), and codeword 605-*b* has approximately 40% of the total CBs (i.e., 39/100). Thus, eight CBG bundles 610 may be formed for codeword 605-*a* (i.e., 60% of 12 CBG bundles rounded up), and four CBG bundles 610 may be formed for codeword 605-*b* (i.e., 40% of 12 CBG bundles rounded down). After the CBG bundles 610 have been proportioned for each codeword 605, the CBGs may be bundled uniformly within each codeword 605. For example, the eight CBG bundles 610 proportioned for codeword 605-*a* may include four CBG bundles 610-*a* of two CBGs 615 each and four CBG bundles 610-*b* of one CBG 615 each. Additionally, the four CBG bundles 610 proportioned for codeword 605-*b* may include four CBG bundles 610-*c* of three CBGs 625 each.

Alternatively, the number of CBs may be split among a number of CBGs for both codewords 605 based on the total number of CBs between both codewords 605. For example, codeword 605-*a* may have 100 CBs, and codeword 605-*b* may have 50 CBs. The total number of 150 CBs may be split among 10 total CBGs. Similar to above, the number of CBGs per codeword 605 may be determined proportionally. Therefore, codeword 605-*a* may include seven CBGs 615 (i.e., 100/150 of 10 CBGs rounded up), and codeword 605-*b* may include the remaining three CBGs 625. After the CBGs have been proportioned for each codeword 605, the number of CBs per CBG may be divided out in approximately a uniform way. For example, codeword 605-*a* may split its 100 CBs into the proportioned seven CBGs 615 with two CBGs 615 having 15 CBs each and five CBGs having 14 CBs each. Additionally, codeword 605-*b* may split its 50 CBs into the proportioned three CBGs 625 with two CBGs 625 having 17 CBs each and one CBG 625 having 16 CBs.

In other cases, additional bits may be added to the ACK/NACK feedback bits to provide a bitmap to indicate for which codewords 605 the ACK/NACK feedback bits are intended. For example, if both bits are one (i.e., 11), the ACK/NACK feedback bits may be for both codeword 605-*a* and 605-*b*. In such cases, the CBGs of both codewords 605 may be combined as described with reference to FIG. 5. Additionally or alternatively, if only one bit is one (i.e., 10 or 01), the ACK/NACK feedback bits may apply to only one codeword 605, while the other codeword 605 all passes. For example, if the two bits are "10," the ACK/NACK feedback may apply to codeword 605-*a*, and codeword 605-*b* may be assumed to have been transmitted correctly. If both bits are zero (i.e., 00), it may indicate only one codeword 605 is transmitted.

Figure 7:
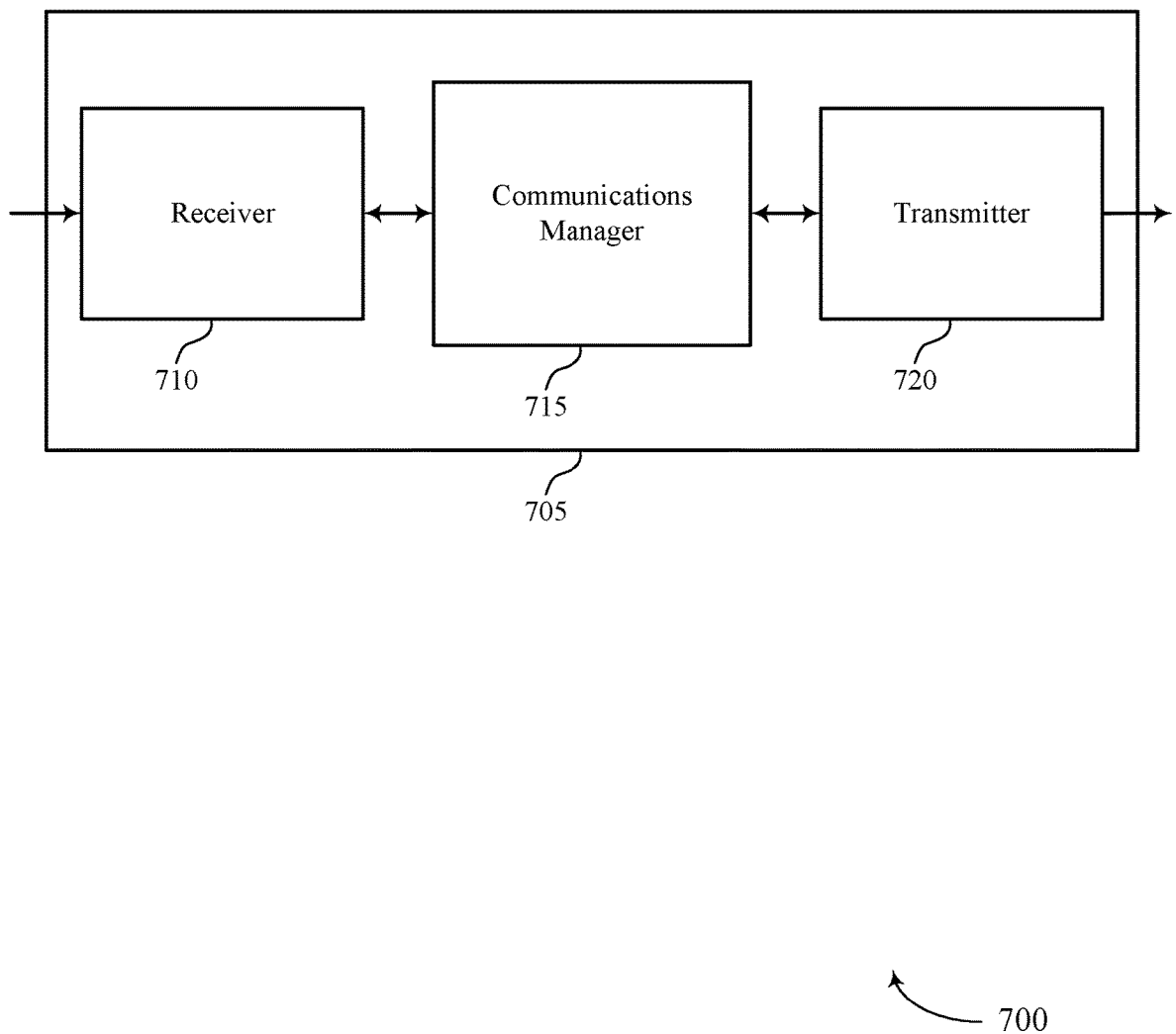
FIGS. 7 through 9 show block diagrams of a device that supports overlapping code block groups for multiple codewords in accordance with aspects of the present disclosure.

FIG. 7 shows a block diagram 700 of a wireless device 705 that supports overlapping code block groups for multiple codewords in accordance with aspects of the present disclosure. Wireless device 705 may be an example of aspects of a base station 105 or a UE 115 as described herein. Wireless device 705 may include receiver 710, communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to overlapping code block groups for multiple codewords, etc.). Information may be passed on to other components of the device. The receiver 710 may be an example of aspects of the transceiver 1035 described with reference to FIG. 10. The receiver 710 may utilize a single antenna or a set of antennas.

Communications manager 715 may be an example of aspects of the communications manager 1015 described with reference to FIG. 10. Communications manager 715 and/or at least some of its various sub-components may be implemented in hardware, software executed by a processor, firmware, or any combination thereof. If implemented in software executed by a processor, the functions of the communications manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The communications manager 715 and/or at least some of its various sub-components may be physically located at various positions, including being distributed such that portions of functions are implemented at different physical locations by one or more physical devices. In some examples, communications manager 715 and/or at least some of its various sub-components may be a separate and distinct component in accordance with various aspects of the present disclosure. In other examples, communications manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 715 may receive a transmission including a first codeword received over a first set of layers and a second codeword received over a second set of layers, where the first codeword may include a first set of code blocks and the second codeword may include a second set of code blocks. Communications manager 715 may perform a decoding operation on the first and second pluralities of code blocks of the transmission and determine an association between a set of feedback bits for the transmission and the first and second pluralities of code blocks based on a code block group configuration for the first and second codewords. Further, a number of bits of the set of feedback bits may correspond to a number of code blocks for a single layer transmission. Communications manager 715 may transmit a message including the set of feedback bits based on a result of the decoding operation and the determined association.

The communications manager 715 may also transmit, in a first transmission, a first codeword over a first set of layers and a second codeword over a second set of layers, where the first codeword may include a first set of code blocks and the second codeword may include a second set of code blocks. Communications manager 715 may receive a message including a set of feedback bits for the first codeword and the second codeword, where the set of feedback bits may be associated with the first and second pluralities of code blocks based on a code block group configuration for the first and second codewords. Further, a number of bits of the set of feedback bits may correspond to a number of code blocks for a single layer transmission. Communications manager 715 may determine whether to retransmit a code block of the first or second pluralities of code blocks based on the set of feedback bits.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas.

Figure 8:
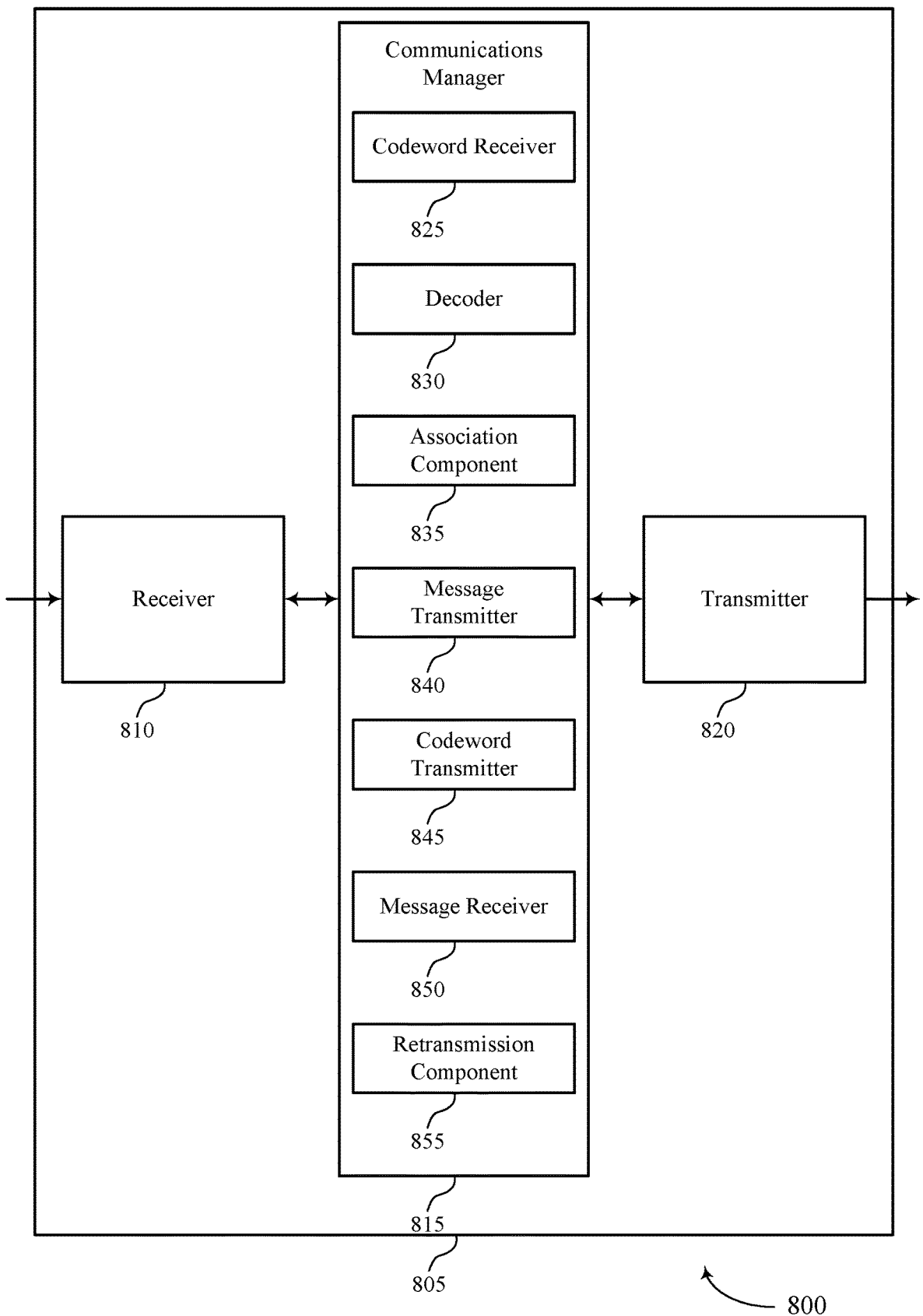

FIG. 8 shows a block diagram 800 of a wireless device 805 that supports overlapping code block groups for multiple codewords in accordance with aspects of the present disclosure. Wireless device 805 may be an example of aspects of a wireless device 705, a base station 105, or a UE 115 as described with reference to FIG. 7. Wireless device 805 may include receiver 810, communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to overlapping code block groups for multiple codewords, etc.). Information may be passed on to other components of the device. The receiver 810 may be an example of aspects of the transceiver 1035 described with reference to FIG. 10. The receiver 810 may utilize a single antenna or a set of antennas.

Communications manager 815 may be an example of aspects of the communications manager 1015 described with reference to FIG. 10. Communications manager 815 may also include codeword receiver 825, decoder 830, association component 835, message transmitter 840, codeword transmitter 845, message receiver 850, and retransmission component 855.

Codeword receiver 825 may receive a transmission including a first codeword received over a first set of layers and a second codeword received over a second set of layers, where the first codeword may include a first set of code blocks and the second codeword may include a second set of code blocks. In some cases, a number of code blocks of the first set of code blocks may be different from a number of code blocks of the second set of code blocks.

Decoder 830 may perform a decoding operation on the first and second pluralities of code blocks of the transmission.

Association component 835 may determine an association between a set of feedback bits for the transmission and the first and second pluralities of code blocks based on a code block group configuration for the first and second codewords. Further, a number of bits of the set of feedback bits may correspond to a number of code blocks for a single layer transmission. Association component 835 may uniformly split the first set of code blocks into the first set of code block groups and the second set of code blocks into the second set of code block groups and associate each feedback bit of the set of feedback bits with a respective bundled code block group. In some cases, association component 835 may split the number of code block group bundles into a first set of code block group bundles for the first codeword and a second set of code block group bundles for the second codeword. Further, association component 835 may split the number of code block groups into a first set of code block groups for the first codeword and a second set of code block groups for the second codeword in proportion to a number of code blocks in the first codeword and a number of code blocks in the second codeword. In some cases, Association component 835 may bundle consecutive code block groups of the first codeword and the second codeword into the first and second sets of code block group bundles.

In some cases, determining the association between the set of feedback bits and the first and second pluralities of code blocks may include one or more of: bundling respective code block groups of the first and second codewords, determining a number of code block group bundles based on the number of bits of the set of feedback bits, or determining a number of code block groups based on the number of bits of the set of feedback bits. Determining the code block group configuration may include assigning the first and second pluralities of code blocks to code block groups according to time resource boundaries for the first and second codewords. Alternatively, determining the code block group configuration may include assigning the first and second pluralities of code blocks to code block groups according to a uniform distribution. In some cases, the number of code block group bundles may be uniformly split into the first set of code block group bundles and the second set of code block group bundles. Alternatively, the number of code block group bundles may be split into the first set of code block group bundles and the second set of code block group bundles in proportion to a number of code blocks in the first codeword and a number of code blocks in the second codeword.

Message transmitter 840 may transmit a message including the set of feedback bits based on a result of the decoding operation and the determined association. In some cases, the message may include a feedback application bitmap indicating the applicability of the set of feedback bits to one or both of the first codeword or to the second codeword. In some examples, the feedback application bitmap indicates whether all code block groups of one or both of the first codeword or the second codeword failed the decoding operation.

Codeword transmitter 845 may transmit, in a first transmission, a first codeword over a first set of layers and a second codeword over a second set of layers, where the first codeword may include a first set of code blocks and the second codeword may include a second set of code blocks. In some cases, a number of code blocks of the first set of code blocks is different from a number of code blocks of the second set of code blocks.

Message receiver 850 may receive a message including a set of feedback bits for the first codeword and the second codeword, where the set of feedback bits may be associated with the first and second pluralities of code blocks based on a code block group configuration for the first and second codewords. Further, a number of bits of the set of feedback bits may correspond to a number of code blocks for a single layer transmission. In some cases, determining the code block group configuration may include assigning the first and second pluralities of code blocks to code block groups according to time resource boundaries for the first and second codewords. In some examples, each code block group of the code block groups spans a symbol of a set of symbols over which the first transmission is transmitted. In some aspects, the message may include a feedback application bitmap indicating the applicability of the set of feedback bits to one or both of the first codeword or to the second codeword. In some instances, the feedback application bitmap indicates whether all code block groups of one or both of the first codeword or the second codeword failed the decoding operation. In some cases, determining the code block group configuration may include assigning the first and second pluralities of code blocks to code block groups according to a uniform distribution.

Retransmission component 855 may determine whether to retransmit a code block of the first or second pluralities of code blocks based on the set of feedback bits and uniformly split the first set of code blocks into the first set of code block groups and the second set of code blocks into the second set of code block groups. Retransmission component 855 may associate each feedback bit of the set of feedback bits with a respective bundled code block group and split the number of code block group bundles into a first set of code block group bundles for the first codeword and a second set of code block group bundles for the second codeword. In some cases, retransmission component 855 may split the number of code block groups into a first set of code block groups for the first codeword and a second set of code block groups for the second codeword in proportion to a number of code blocks in the first codeword and a number of code blocks in the second codeword. Retransmission component 855 may bundle consecutive code block groups of the first codeword and the second codeword into the first and second sets of code block group bundles.

In some examples, determining whether to retransmit the code block may include determining a number of code block group bundles based on the number of bits of the set of feedback bits. In some aspects, determining whether to retransmit the code block may include bundling respective code block groups of the first and second codewords. In some instances, the number of code block group bundles are uniformly split into the first set of code block group bundles and the second set of code block group bundles. In some cases, the number of code block group bundles are split into the first set of code block group bundles and the second set of code block group bundles in proportion to a number of code blocks in the first codeword and a number of code blocks in the second codeword. In some cases, determining whether to retransmit the code block may include determining a number of code block groups based on the number of bits of the set of feedback bits.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
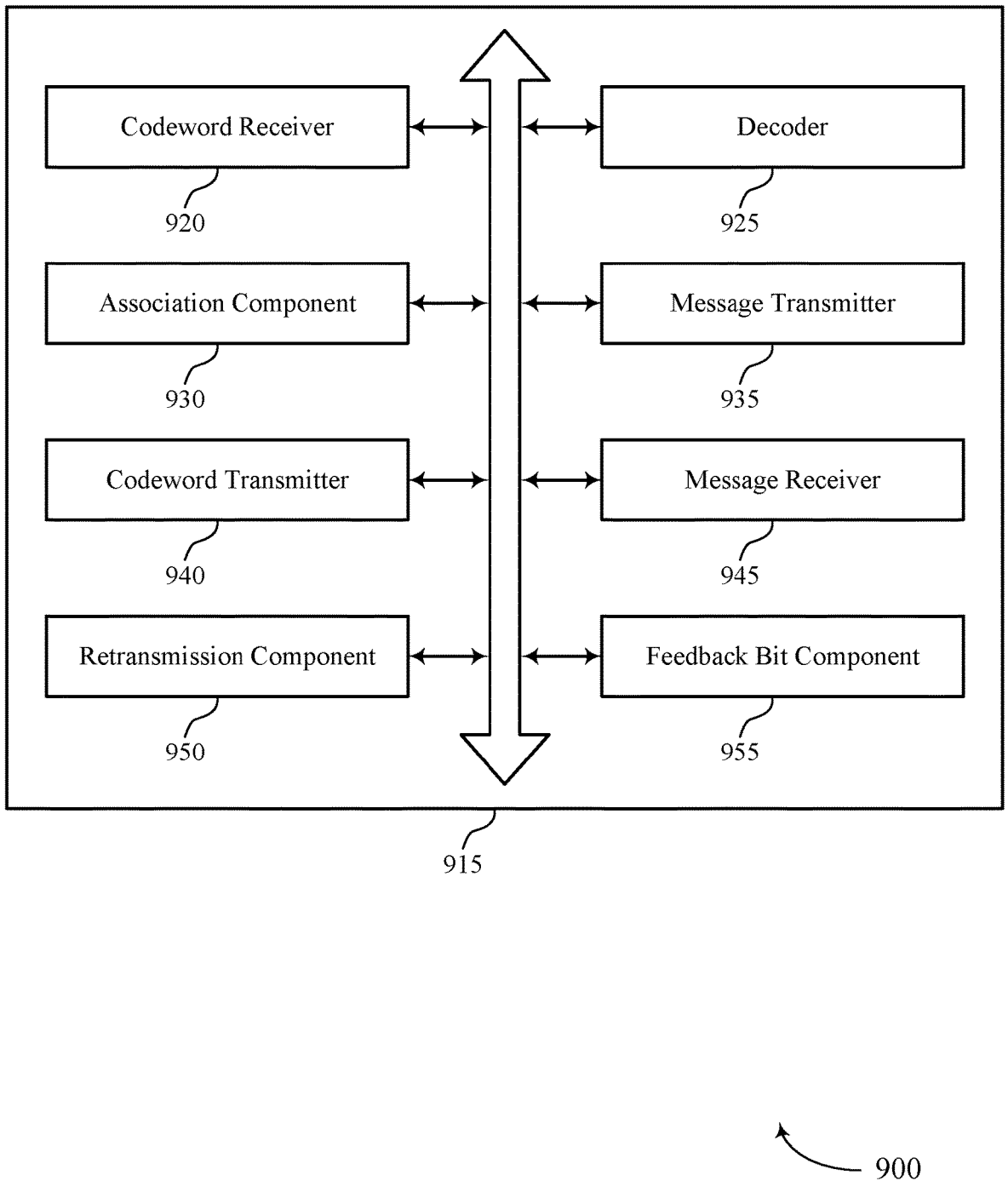

FIG. 9 shows a block diagram 900 of a communications manager 915 that supports overlapping code block groups for multiple codewords in accordance with aspects of the present disclosure. The communications manager 915 may be an example of aspects of a communications manager 715, a communications manager 815, or a communications manager 1015 described with reference to FIGS. 7, 8, and 10. The communications manager 915 may include codeword receiver 920, decoder 925, association component 930, message transmitter 935, codeword transmitter 940, message receiver 945, retransmission component 950, and feedback bit component 955. Each of these modules may communicate, directly or indirectly, with one another (e.g., via one or more buses).

Codeword receiver 920 may receive a transmission including a first codeword received over a first set of layers and a second codeword received over a second set of layers, where the first codeword may include a first set of code blocks and the second codeword may include a second set of code blocks. In some cases, a number of code blocks of the first set of code blocks is different from a number of code blocks of the second set of code blocks.

Decoder 925 may perform a decoding operation on the first and second pluralities of code blocks of the transmission.

Association component 930 may determine an association between a set of feedback bits for the transmission and the first and second pluralities of code blocks based on a code block group configuration for the first and second codewords. Further, a number of bits of the set of feedback bits may correspond to a number of code blocks for a single layer transmission. Association component 930 may uniformly split the first set of code blocks into the first set of code block groups and the second set of code blocks into the second set of code block groups and associate each feedback bit of the set of feedback bits with a respective bundled code block group. Association component 930 may split the number of code block group bundles into a first set of code block group bundles for the first codeword and a second set of code block group bundles for the second codeword. In some cases, association component 930 may split the number of code block groups into a first set of code block groups for the first codeword and a second set of code block groups for the second codeword in proportion to a number of code blocks in the first codeword and a number of code blocks in the second codeword. Retransmission component 855 may bundle consecutive code block groups of the first codeword and the second codeword into the first and second sets of code block group bundles.

In some cases, determining the association between the set of feedback bits and the first and second pluralities of code blocks may include bundling respective code block groups of the first and second codewords. In some examples, determining the association between the set of feedback bits and the first and second pluralities of code blocks may include determining a number of code block group bundles based on the number of bits of the set of feedback bits. In some aspects, the code block group configuration may include assigning the first and second pluralities of code blocks to code block groups according to time resource boundaries for the first and second codewords. In some instances, the number of code block group bundles are uniformly split into the first set of code block group bundles and the second set of code block group bundles. In some cases, the number of code block group bundles are split into the first set of code block group bundles and the second set of code block group bundles in proportion to a number of code blocks in the first codeword and a number of code blocks in the second codeword. In some examples, determining the code block group configuration may include assigning the first and second pluralities of code blocks to code block groups according to a uniform distribution. In some aspects, determining the association between the feedback bits and the first and second pluralities of code blocks may include determining a number of code block groups based on the number of bits of the set of feedback bits.

Message transmitter 935 may transmit a message including the set of feedback bits based on a result of the decoding operation and the determined association. In some cases, the message may include a feedback application bitmap indicating the applicability of the set of feedback bits to one or both of the first codeword or to the second codeword. In some cases, the feedback application bitmap indicates whether all code block groups of one or both of the first codeword or the second codeword failed the decoding operation.

Codeword transmitter 940 may transmit, in a first transmission, a first codeword over a first set of layers and a second codeword over a second set of layers, where the first codeword may include a first set of code blocks and the second codeword may include a second set of code blocks. In some cases, a number of code blocks of the first set of code blocks is different from a number of code blocks of the second set of code blocks.

Message receiver 945 may receive a message including a set of feedback bits for the first codeword and the second codeword, where the set of feedback bits may be associated with the first and second pluralities of code blocks based on a code block group configuration for the first and second codewords. Further, a number of bits of the set of feedback bits may correspond to a number of code blocks for a single layer transmission. In some cases, determining the code block group configuration may include assigning the first and second pluralities of code blocks to code block groups according to time resource boundaries for the first and second codewords. In some examples, each code block group of the code block groups spans a symbol of a set of symbols over which the first transmission is transmitted. In some aspects, the message may include a feedback application bitmap indicating the applicability of the set of feedback bits to one or both of the first codeword or to the second codeword. In some instances, the feedback application bitmap indicates whether all code block groups of one or both of the first codeword or the second codeword failed the decoding operation. In some cases, determining the code block group configuration may include assigning the first and second pluralities of code blocks to code block groups according to a uniform distribution.

Retransmission component 950 may determine whether to retransmit a code block of the first or second pluralities of code blocks based on the set of feedback bits. Retransmission component 950 may uniformly split the first set of code blocks into the first set of code block groups and the second set of code blocks into the second set of code block groups and associate each feedback bit of the set of feedback bits with a respective bundled code block group. Retransmission component 950 may split the number of code block group bundles into a first set of code block group bundles for the first codeword and a second set of code block group bundles for the second codeword. In some cases, retransmission component 950 may split the number of code block groups into a first set of code block groups for the first codeword and a second set of code block groups for the second codeword in proportion to a number of code blocks in the first codeword and a number of code blocks in the second codeword. Retransmission component 950 may bundle consecutive code block groups of the first codeword and the second codeword into the first and second sets of code block group bundles.

In some cases, determining whether to retransmit the code block may include determining a number of code block group bundles based on the number of bits of the set of feedback bits. In some examples, determining whether to retransmit the code block may include bundling respective code block groups of the first and second codewords. In some aspects, the number of code block group bundles may be uniformly split into the first set of code block group bundles and the second set of code block group bundles. In some instances, the number of code block group bundles may be split into the first set of code block group bundles and the second set of code block group bundles in proportion to a number of code blocks in the first codeword and a number of code blocks in the second codeword. In some cases, determining whether to retransmit the code block may include determining a number of code block groups based on the number of bits of the set of feedback bits.

Feedback bit component 955 may determine the number of feedback bits based on a number of symbols of the set of symbols, where each code block group of the code block groups may span a symbol of the set of symbols.

Figure 10:
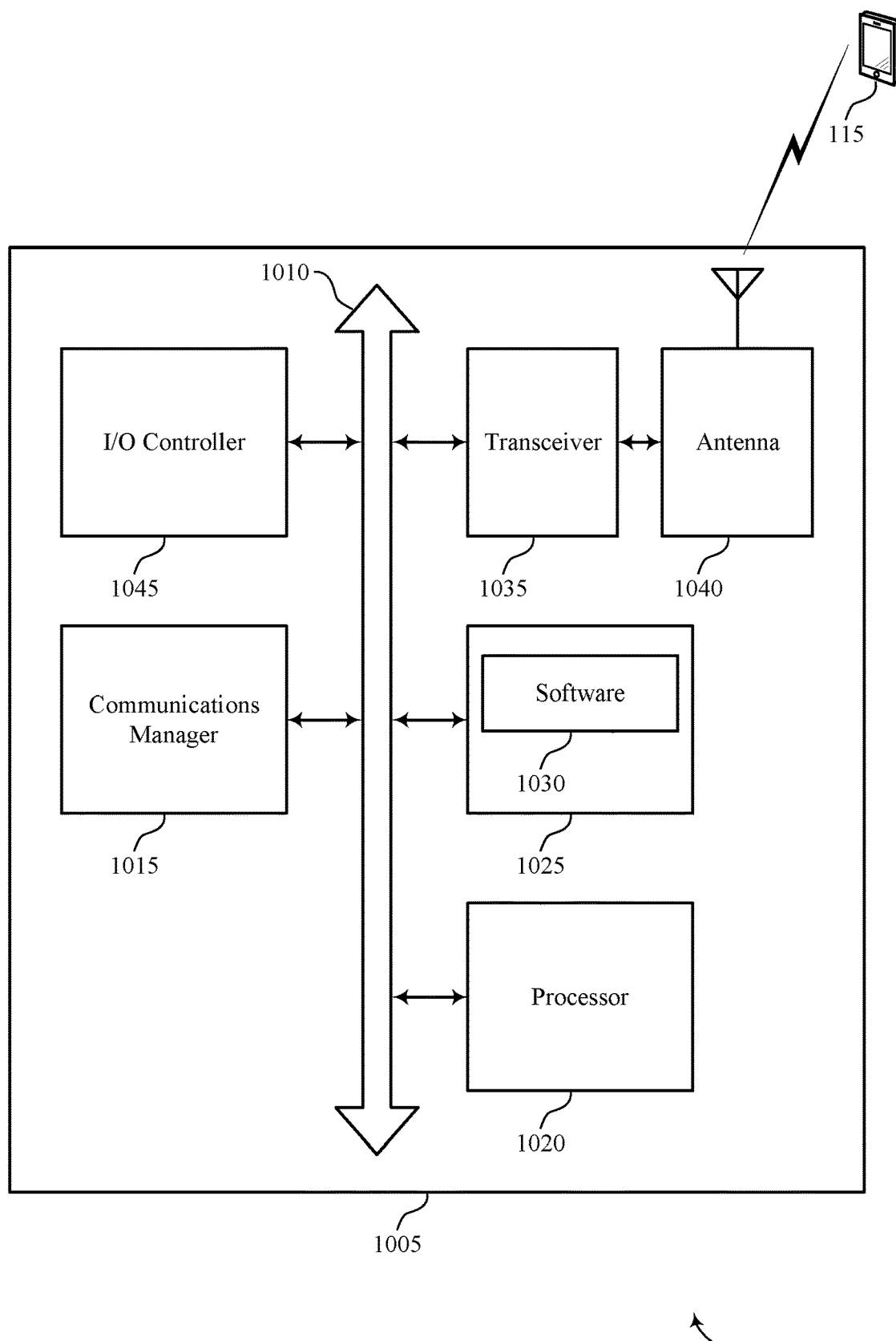
FIG. 10 illustrates a block diagram of a system including a wireless device that supports overlapping code block groups for multiple codewords in accordance with aspects of the present disclosure.

FIG. 10 shows a diagram of a system 1000 including a device 1005 that supports overlapping code block groups for multiple codewords in accordance with aspects of the present disclosure. Device 1005 may be an example of or include the components of wireless device 705, wireless device 805, a base station 105, or a UE 115 as described above, e.g., with reference to FIGS. 7 and 8. Device 1005 may include components for bi-directional voice and data communications including components for transmitting and receiving communications, including communications manager 1015, processor 1020, memory 1025, software 1030, transceiver 1035, antenna 1040, and I/O controller 1045. These components may be in electronic communication via one or more buses (e.g., bus 1010).

The communications manager 1015 may be an example of aspects of a communications manager 715, a communications manager 815, or a communications manager 915 described with reference to FIGS. 7, 8, and 9.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting overlapping code block groups for multiple codewords).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

Software 1030 may include code to implement aspects of the present disclosure, including code to support overlapping code block groups for multiple codewords. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system. In other cases, I/O controller 1045 may represent or interact with a modem, a keyboard, a mouse, a touchscreen, or a similar device. In some cases, I/O controller 1045 may be implemented as part of a processor. In some cases, a user may interact with device 1005 via I/O controller 1045 or via hardware components controlled by I/O controller 1045.

Figure 11:
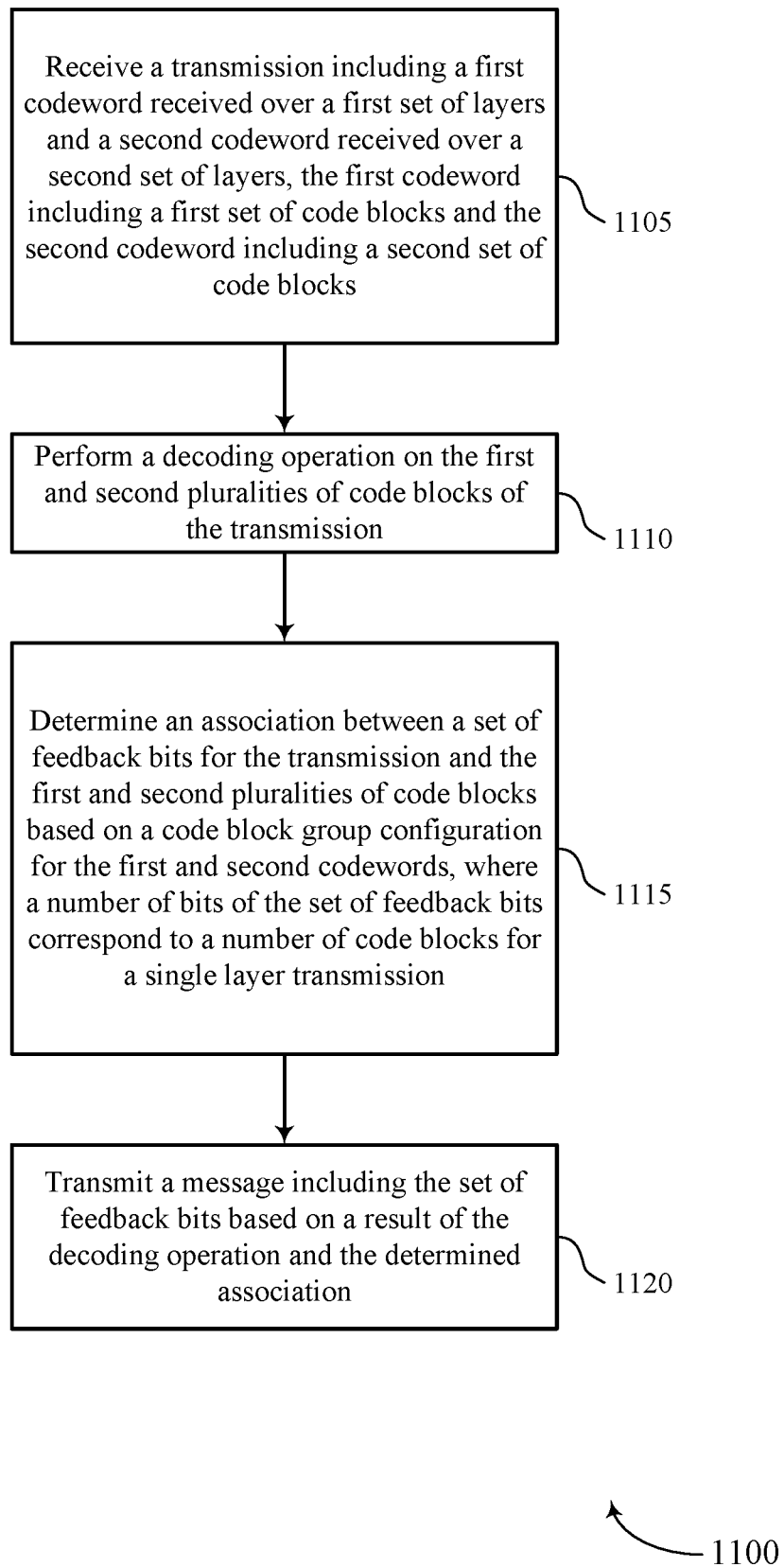
FIGS. 11 and 12 illustrate methods for overlapping code block groups for multiple codewords in accordance with aspects of the present disclosure.

FIG. 11 shows a flowchart illustrating a method 1100 for overlapping code block groups for multiple codewords in accordance with aspects of the present disclosure. The operations of method 1100 may be implemented by a base station 105, a UE 115, or their components as described herein. For example, the operations of method 1100 may be performed by a communications manager as described with reference to FIGS. 7 through 10. In some examples, a base station 105 or UE 115 may execute a set of codes to control the functional elements of the device to perform the functions described below. Additionally or alternatively, the base station 105 or UE 115 may perform aspects of the functions described below using special-purpose hardware.

At block 1105 the base station 105 or UE 115 may receive a transmission including a first codeword received over a first set of layers and a second codeword received over a second set of layers, where the first codeword may include a first plurality of code blocks and the second codeword may include a second plurality of code blocks. The operations of block 1105 may be performed according to the methods described herein. In certain examples, aspects of the operations of block 1105 may be performed by a codeword receiver as described with reference to FIGS. 7 through 10.

At block 1110 the base station 105 or UE 115 may perform a decoding operation on the first and second pluralities of code blocks of the transmission. The operations of block 1110 may be performed according to the methods described herein. In certain examples, aspects of the operations of block 1110 may be performed by a decoder as described with reference to FIGS. 7 through 10.

At block 1115 the base station 105 or UE 115 may determine an association between a set of feedback bits for the transmission and the first and second pluralities of code blocks based on a code block group configuration for the first and second codewords. Further, a number of bits of the set of feedback bits may correspond to a number of code blocks for a single layer transmission. The operations of block 1115 may be performed according to the methods described herein. In certain examples, aspects of the operations of block 1115 may be performed by an association component as described with reference to FIGS. 7 through 10.

At block 1120 the base station 105 or UE 115 may transmit a message including the set of feedback bits based on a result of the decoding operation and the determined association. The operations of block 1120 may be performed according to the methods described herein. In certain examples, aspects of the operations of block 1120 may be performed by a message transmitter as described with reference to FIGS. 7 through 10.

Figure 12:
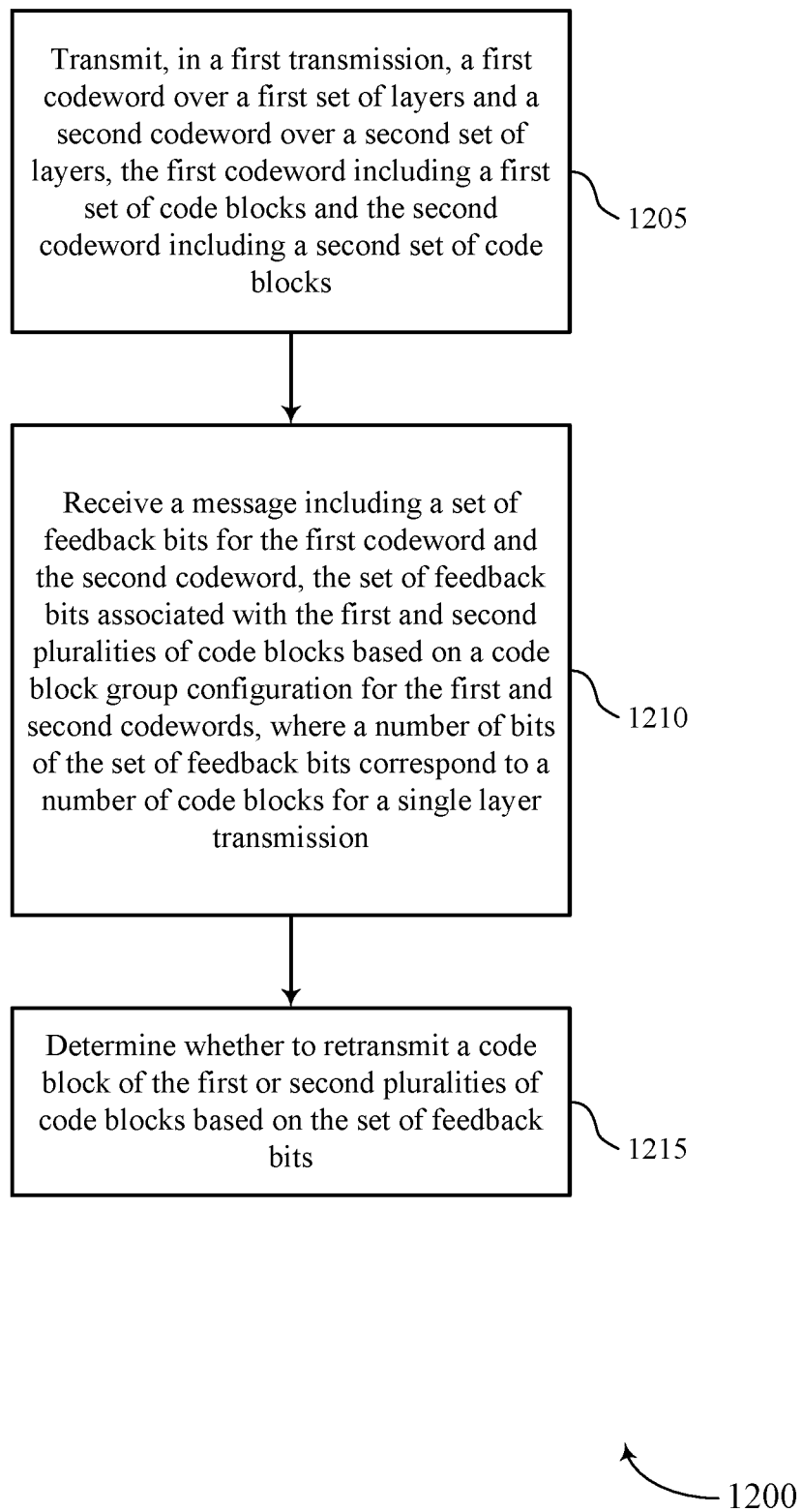

FIG. 12 shows a flowchart illustrating a method 1200 for overlapping code block groups for multiple codewords in accordance with aspects of the present disclosure. The operations of method 1200 may be implemented by a base station 105, a UE 115, or their components as described herein. For example, the operations of method 1200 may be performed by a communications manager as described with reference to FIGS. 7 through 10. In some examples, a base station 105 or a UE 115 may execute a set of codes to control the functional elements of the device to perform the functions described below. Additionally or alternatively, the base station 105 or a UE 115 may perform aspects of the functions described below using special-purpose hardware.

At block 1205 the base station 105 or UE 115 may transmit, in a first transmission, a first codeword over a first set of layers and a second codeword over a second set of layers, where the first codeword may include a first plurality of code blocks and the second codeword may include a second plurality of code blocks. The operations of block 1205 may be performed according to the methods described herein. In certain examples, aspects of the operations of block 1205 may be performed by a codeword transmitter as described with reference to FIGS. 7 through 10.

At block 1210 the base station 105 or UE 115 may receive a message including a set of feedback bits for the first codeword and the second codeword, where the set of feedback bits may be associated with the first and second pluralities of code blocks based on a code block group configuration for the first and second codewords. Further, a number of bits of the set of feedback bits may correspond to a number of code blocks for a single layer transmission. The operations of block 1210 may be performed according to the methods described herein. In certain examples, aspects of the operations of block 1210 may be performed by a message receiver as described with reference to FIGS. 7 through 10.

At block 1215 the base station 105 or UE 115 may determine whether to retransmit a code block of the first or second pluralities of code blocks based on the set of feedback bits. The operations of block 1215 may be performed according to the methods described herein. In certain examples, aspects of the operations of block 1215 may be performed by a retransmission component as described with reference to FIGS. 7 through 10.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
receiving a transmission comprising a first codeword received over a first set of layers and a second codeword received over a second set of layers, the first codeword comprising a first plurality of code blocks and the second codeword comprising a second plurality of code blocks, wherein the first codeword and second codeword at least partially overlap in time;
performing a decoding operation on the first and second pluralities of code blocks of the transmission;
determining an association between a set of feedback bits for the transmission and the code blocks of the first codeword and the second codeword based at least in part on the first codeword and the second codeword at least partially overlapping in time and a code block group configuration for the first and second codewords, wherein a number of bits of the set of feedback bits correspond to a number of code blocks for a single layer transmission; and
transmitting a message comprising the set of feedback bits based at least in part on a result of the decoding operation and the determined association.

2. The method of claim 1, wherein the code block group configuration comprises:
assigning the first and second pluralities of code blocks to code block groups according to time-frequency resource boundaries for the first and second codewords.

3. The method of claim 2, wherein determining the association between the set of feedback bits and the first and second pluralities of code blocks comprises:
bundling respective code block groups of the first and second codewords; and
associating each feedback bit of the set of feedback bits with a respective bundled code block group.

4. The method of claim 2, further comprising:
determining the number of feedback bits based at least in part on a number of symbols of a set of symbols, wherein each code block group of the code block groups spans a symbol of the set of symbols.

5. The method of claim 2, wherein determining the association between the set of feedback bits and the first and second pluralities of code blocks comprises:
determining a number of code block group bundles based at least in part on the number of bits of the set of feedback bits;
splitting the number of code block group bundles into a first set of code block group bundles for the first codeword and a second set of code block group bundles for the second codeword; and
bundling consecutive code block groups of the first codeword and the second codeword into the first and second sets of code block group bundles.

6. The method of claim 5, wherein:
the number of code block group bundles are uniformly split into the first set of code block group bundles and the second set of code block group bundles.

7. The method of claim 5, wherein
the number of code block group bundles are split into the first set of code block group bundles and the second set of code block group bundles in proportion to a number of code blocks in the first codeword and a number of code blocks in the second codeword.

8. The method of claim 2, wherein the message comprises a feedback application bitmap indicating the applicability of the set of feedback bits to one or both of the first codeword or to the second codeword.

9. The method of claim 8, wherein the feedback application bitmap indicates whether all code block groups of one or both of the first codeword or the second codeword failed the decoding operation.

10. The method of claim 2, wherein a number of code blocks of the first plurality of code blocks is different from a number of code blocks of the second plurality of code blocks.

11. The method of claim 1, wherein the code block group configuration comprises:
assigning the first and second pluralities of code blocks to code block groups according to a uniform distribution.

12. The method of claim 11, wherein determining the association between the feedback bits and the first and second pluralities of code blocks comprises:
determining a number of code block groups based at least in part on the number of bits of the set of feedback bits;
splitting the number of code block groups into a first set of code block groups for the first codeword and a second set of code block groups for the second codeword in proportion to a number of code blocks in the first codeword and a number of code blocks in the second codeword; and
splitting the first plurality of code blocks into the first set of code block groups and the second plurality of code blocks into the second set of code block groups.

13. A method for wireless communication, comprising:
transmitting, in a first transmission, a first codeword over a first set of layers and a second codeword over a second set of layers, the first codeword comprising a first plurality of code blocks and the second codeword comprising a second plurality of code blocks, wherein the first codeword and second codeword at least partially overlap in time;
receiving a message comprising a set of feedback bits for the first codeword and the second codeword, the set of feedback bits associated with the code blocks of the first codeword and the second codeword based at least in part on the first codeword and the second codeword at least partially overlapping in time and a code block group configuration for the first and second codewords, wherein a number of bits of the set of feedback bits correspond to a number of code blocks for a single layer transmission; and
determining whether to retransmit a code block of the first or second pluralities of code blocks based at least in part on the set of feedback bits.

14. The method of claim 13, wherein the code block group configuration comprises:
assigning the first and second pluralities of code blocks to code block groups according to time-frequency resource boundaries for the first and second codewords.

15. The method of claim 14, wherein determining whether to retransmit the code block comprises:
bundling respective code block groups of the first and second codewords; and
associating each feedback bit of the set of feedback bits with a respective bundled code block group.

16. The method of claim 14, wherein each code block group of the code block groups spans a symbol of a set of symbols over which the first transmission is transmitted.

17. The method of claim 14, wherein determining whether to retransmit the code block comprises:
determining a number of code block group bundles based at least in part on the number of bits of the set of feedback bits;
splitting the number of code block group bundles into a first set of code block group bundles for the first codeword and a second set of code block group bundles for the second codeword; and
bundling consecutive code block groups of the first codeword and the second codeword into the first and second sets of code block group bundles.

18. The method of claim 17, wherein the number of code block group bundles are uniformly split into the first set of code block group bundles and the second set of code block group bundles.

19. The method of claim 17, wherein the number of code block group bundles are split into the first set of code block group bundles and the second set of code block group bundles in proportion to a number of code blocks in the first codeword and a number of code blocks in the second codeword.

20. The method of claim 14, wherein the message comprises a feedback application bitmap indicating the applicability of the set of feedback bits to one or both of the first codeword or to the second codeword.

21. The method of claim 20, wherein the feedback application bitmap indicates whether all code block groups of one or both of the first codeword or the second codeword failed the decoding operation.

22. The method of claim 14, wherein a number of code blocks of the first plurality of code blocks is different from a number of code blocks of the second plurality of code blocks.

23. The method of claim 13, wherein the code block group configuration comprises:
assigning the first and second pluralities of code blocks to code block groups according to a uniform distribution.

24. The method of claim 23, wherein determining whether to retransmit the code block comprises:
determining a number of code block groups based at least in part on the number of bits of the set of feedback bits;
splitting the number of code block groups into a first set of code block groups for the first codeword and a second set of code block groups for the second codeword in proportion to a number of code blocks in the first codeword and a number of code blocks in the second codeword; and
uniformly splitting the first plurality of code blocks into the first set of code block groups and the second plurality of code blocks into the second set of code block groups.

25. An apparatus for wireless communication, comprising:
a processor;
memory in electronic communication with the processor; and
instructions stored in the memory and operable, when executed by the processor, to cause the apparatus to:
receive a transmission comprising a first codeword received over a first set of layers and a second codeword received over a second set of layers, the first codeword comprising a first plurality of code blocks and the second codeword comprising a second plurality of code blocks, wherein the first codeword and second codeword at least partially overlap in time;
perform a decoding operation on the first and second pluralities of code blocks of the transmission;
determine an association between a set of feedback bits for the transmission and the code blocks of the first codeword and the second codeword based at least in part on the first codeword and the second codeword at least partially overlapping in time and a code block group configuration for the first and second codewords, wherein a number of bits of the set of feedback bits correspond to a number of code blocks for a single layer transmission; and
transmit a message comprising the set of feedback bits based at least in part on a result of the decoding operation and the determined association.

26. The apparatus of claim 25, wherein the code block group configuration comprises:
instructions executable to assign the first and second pluralities of code blocks to code block groups according to time-frequency resource boundaries for the first and second codewords.

27. The apparatus of claim 26, wherein the instructions are further executable to:
bundle respective code block groups of the first and second codewords; and
associate each feedback bit of the set of feedback bits with a respective bundled code block group.

28. An apparatus for wireless communication, comprising:
a processor;
memory in electronic communication with the processor; and
instructions stored in the memory and operable, when executed by the processor, to cause the apparatus to:
transmit, in a first transmission, a first codeword over a first set of layers and a second codeword over a second set of layers, the first codeword comprising a first plurality of code blocks and the second codeword comprising a second plurality of code blocks, wherein the first codeword and second codeword at least partially overlap in time;
receive a message comprising a set of feedback bits for the first codeword and the second codeword, the set of feedback bits associated with the code blocks of the first codeword and the second codeword based at least in part on the first codeword and the second codeword at least partially overlapping in time and code block group configuration for the first and second codewords, wherein a number of bits of the set of feedback bits correspond to a number of code blocks for a single layer transmission; and
determine whether to retransmit a code block of the first or second pluralities of code blocks based at least in part on the set of feedback bits.

29. The apparatus of claim 28, wherein the code block group configuration comprises:
instructions executable to assign the first and second pluralities of code blocks to code block groups according to time resource boundaries for the first and second codewords.

30. The apparatus of claim 29, wherein the instructions are further executable to:
bundle respective code block groups of the first and second codewords; and associate each feedback bit of the set of feedback bits with a respective bundled code block group.

\* \* \* \* \*